July 21, 1936.  B. M. SHIPLEY  2,048,083
CASH REGISTER
Filed Jan. 23, 1929   7 Sheets-Sheet 1

Inventor
Bernis M. Shipley
By Hearl Benst
Ralph E. Warfield
His Attorneys

July 21, 1936.　　　B. M. SHIPLEY　　　2,048,083

CASH REGISTER

Filed Jan. 23, 1929　　　7 Sheets-Sheet 2

Inventor
Bernis M. Shipley
By Hearl Beust
Ralph E. Warfield
His Attorneys

July 21, 1936.   B. M. SHIPLEY   2,048,083
CASH REGISTER
Filed Jan. 23, 1929   7 Sheets-Sheet 3

Inventor
Bernis M. Shipley
By Earl Beust
Ralph E. Warfield
His Attorneys

July 21, 1936.  B. M. SHIPLEY  2,048,083
CASH REGISTER
Filed Jan. 23, 1929  7 Sheets—Sheet 4

Inventor
Bernis M. Shipley
By
His Attorneys

July 21, 1936.  B. M. SHIPLEY  2,048,083
CASH REGISTER
Filed Jan. 23, 1929  7 Sheets-Sheet 5
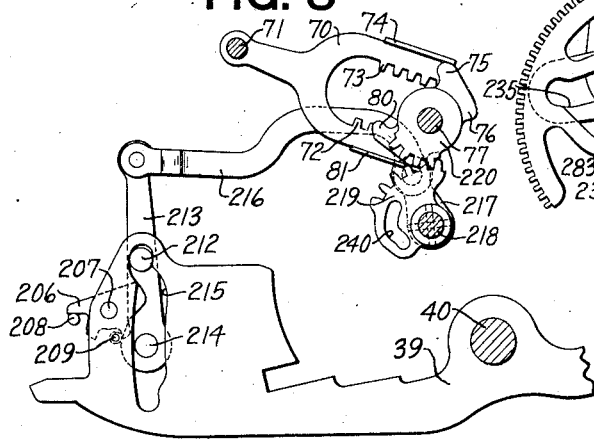
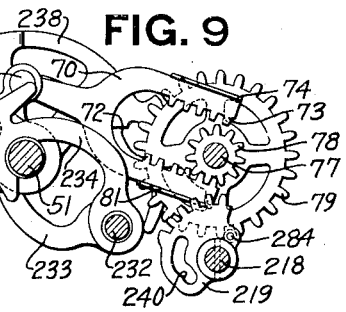
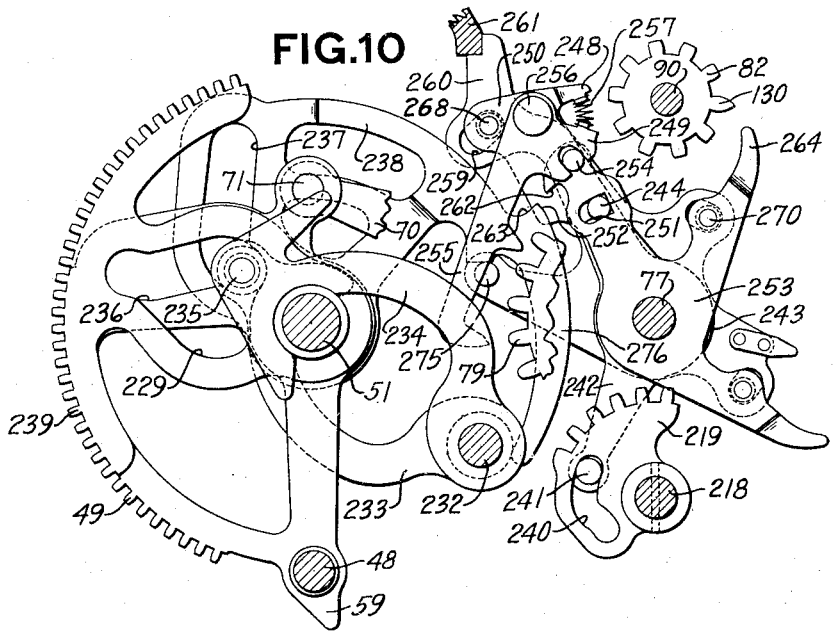
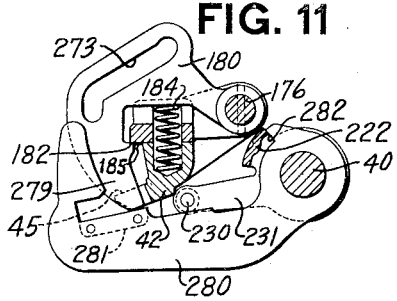
Inventor
Bernis M. Shipley
By
Earl Benst
Ralph E. Warfield
His Attorneys July 21, 1936.  B. M. SHIPLEY  2,048,083
CASH REGISTER
Filed Jan. 23, 1929    7 Sheets-Sheet 6
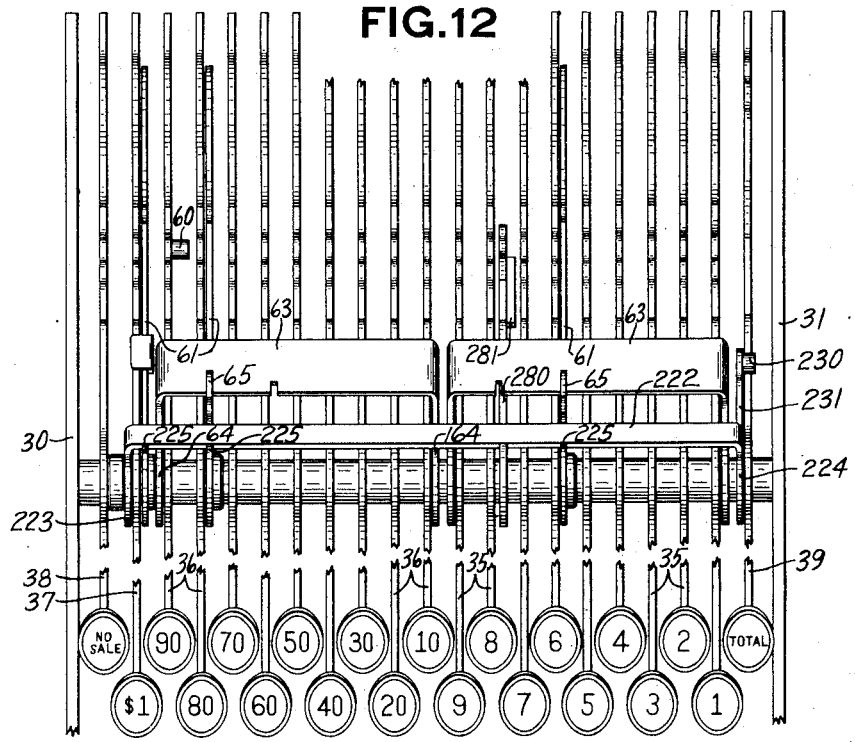
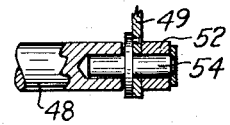
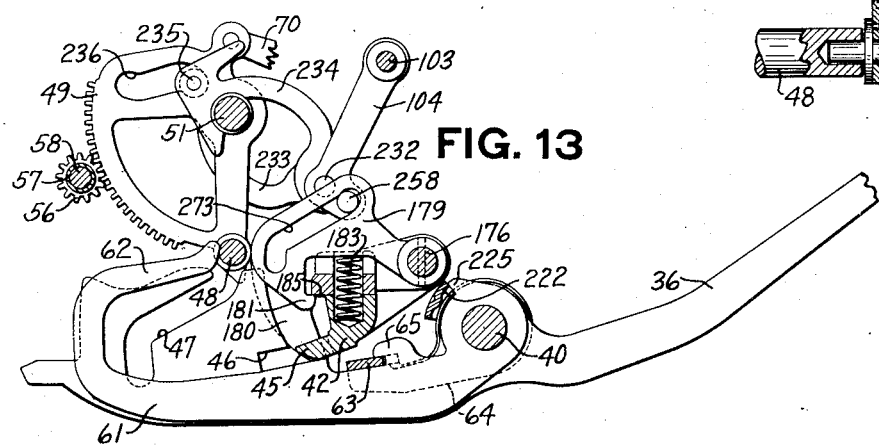
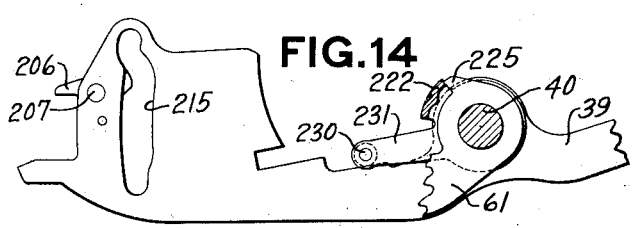
Inventor
Bernis M. Shipley
By Pearl Beust
Ralph E. Warfield
His Attorneys July 21, 1936.  B. M. SHIPLEY  2,048,083
CASH REGISTER
Filed Jan. 23, 1929   7 Sheets-Sheet 7

Inventor
Bernis M. Shipley
By Carl Beust
Ralph E. Warfield
His Attorneys

Patented July 21, 1936

2,048,083

UNITED STATES PATENT OFFICE 2,048,083

CASH REGISTER

Bernis M. Shipley, Dayton, Ohio, assignor to The National Cash Register Company, Dayton, Ohio, a corporation of Maryland Application January 23, 1929, Serial No. 334,482

68 Claims. (Cl. 235—14)

This invention relates to improvements in registers and like machines, and more particularly refers to key-operated registering machines.

Heretofore, it has been extremely difficult to produce a machine of the key-operated or "press-down" key type, which, when the function of resetting the totalizer or totalizers to zero and printing the total therefrom, was applied thereto, operated with a degree of ease which commended such a machine to the public.

It is, therefore, an object of the present invention to provide a key-operated cash register or similar accounting machine with novel differential mechanism for adding amounts into a totalizer or a plurality of totalizers, said differential mechanism being so designed that it requires a minimum expenditure of energy to operate the machine.

Another object of the invention is to provide a cash register or accounting machine of the key-operated type, with novel resetting mechanism operable by the actuation of a particular key, and characterized by its ease of operation.

With these and incidental objects in view, the invention consists of certain novel features of construction and combinations of parts, the essential elements of which are set forth in appended claims and a preferred form or embodiment of which is hereinafter described with reference to the drawings which accompany and form a part of this specification.

In said drawings:

Fig. 8 is a detail side view of the totalizer rack shifting device.

Fig. 9 is a similar view of the totalizer actuator mechanism associated with one of the overflow banks.

Fig. 10 is an enlarged detail side view of the totalizing mechanism.

Fig. 11 is a detail view of the cushion drive between the key coupler and the operating mechanism.

Fig. 12 is a top plan view of the keys and the bail actuated thereby to rock the zero stop arms to their ineffective positions.

Fig. 13 is a detail sectional view of one of the amount keys and some of the mechanism operated thereby.

Fig. 14 is a fragmentary view of the total key and its zero stop pawl throwout bail.

Fig. 15 is a fragmentary sectional view of a part of the differential actuator frame showing details of construction.

General description

Figure 1:
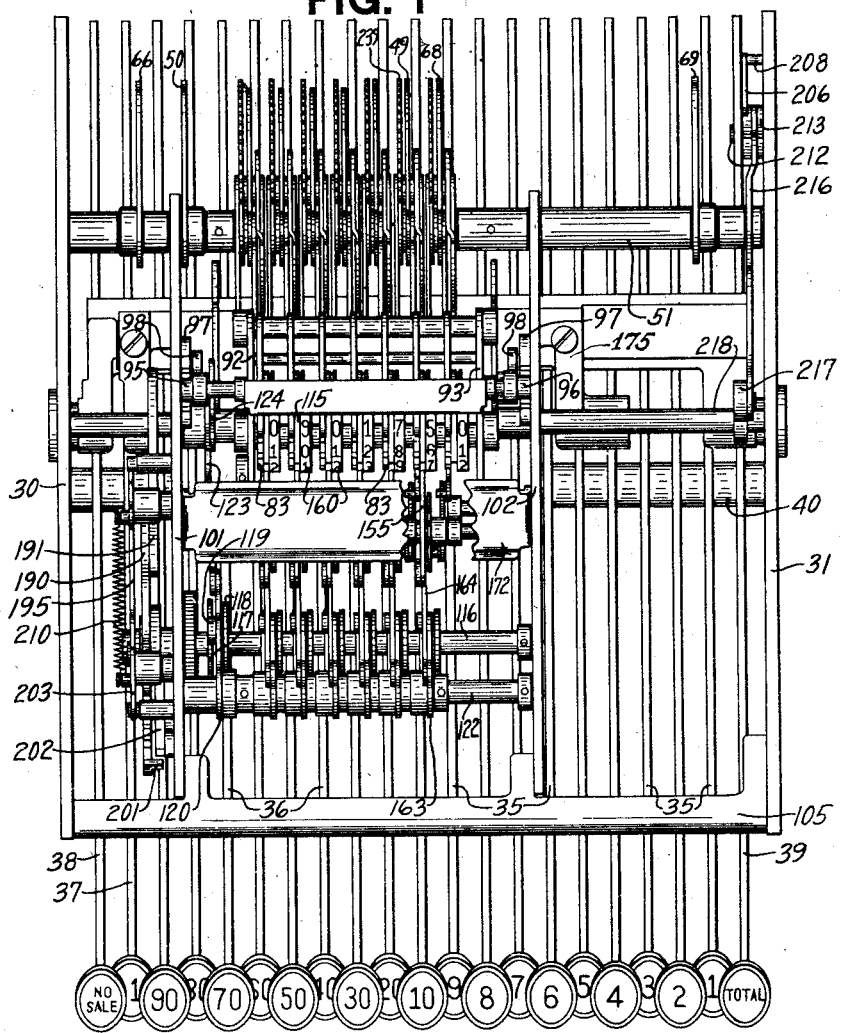
Fig. 1 is a top plan view of the machine with the cabinet removed.

The main elements of a machine of this description, namely, the depressible keys, the differential actuators driven thereby, the totalizers, the totalizer actuating means, and totalizer engaging and disengaging means, usually provided in cash registers of the type to which this application is drawn, are included in the present machine. In addition, mechanism operated by depression of a special key is provided to take the total from the totalizer and restore said totalizer to zero.

As is the case in most machines of this type, depression of an amount key engages the totalizers with the actuators, operates the actuators to add the amount onto the totalizer, set an indicator (not shown), and print the amount of the entry on an issuing receipt and on a record strip, after which the actuators restore to their home positions. The present invention is directed to the differential mechanism, the totalizer and the total taking mechanism, and for this reason, the indication and printing mechanisms have been omitted from this application.

The present invention embodies a novel totalizing or clearing mechanism, which, contrary to the usual resetting mechanism provided in key-operated machines of the prior art, restores the totalizer wheels to zero through the operation of the differential mechanism under the control of the wheels themselves. By the inclusion of this novel totalizing mechanism in the machine chosen to illustrate the present invention, it is possible, by the operation of this special key, to restore the totalizer to zero, setting up the differential actuators at the same time to positions corresponding to the amounts on their respective totalizer wheels. Simultaneously with the setting of the actuators to various adjusted positions to represent the total formerly registered on the totalizer wheels, the indicators (not shown) are likewise adjusted to display such total.

Also, the setting of the differential actuators according to the amounts on the several totalizer wheels, operates to adjust the printing elements, not shown, to print the total.

Novel transfer mechanisms by which the carryover or transfer of the "tens" is accomplished, and novel totalizer engaging and disengaging mechanism, will be described in detail later.

*Detail description*

The main body of the machine is supported between two side frames 30 and 31 (Figs. 1, 2, 7 and 12), secured to the opposite sides of a base 32, and connected at their rear edges by a wide channel bar 29. The base 32, in turn, is fastened to and supported on a framework 33 extended forwardly from the base and forming in conjunction therewith a closure to accommodate a cash drawer, which is not shown herein, it having no bearing on the present invention. A suitable cabinet 34 is provided to enclose the entire machine, the cabinet being extended upwardly at the back to form a dome to enclose the indicators (not shown). Openings 28 in the front and back of the dome enable the indicators to be seen.

*Keyboard*

The keyboard selected for illustrative purposes includes two denominational groups or banks of "press-down" keys, a group 35 (Fig. 1) to register the units of cents, and a group 36 to register the tens of cents, a single units of dollars key 37, a "no-sale" key 38, and a "total" key 39. The "no-sale" key is located at the extreme left of the keyboard, and the "total" key at the extreme right-hand end of the keyboard.

The numbered or amount keys operate differential mechanism in the register to add amounts onto the totalizers, as well as mechanisms to indicate and print the amounts added onto the totalizers. The "total" key 39, when depressed, resets the totalizer to zero, sets up an indicator, not shown, to indicate the nature of the transaction, and prints the total taken from the totalizer. The "total" key also controls the totalizer actuators to turn the totalizer wheels backwardly to their zero positions in a manner to be described later. The "no-sale" key is provided to operate the machine in order to gain access to the cash drawer, not shown, when no money is involved in the transaction. Depression of this key releases the cash drawer, indicates the nature of the transaction, and prints a character indicating that a "no-sale" transaction has been made.

As stated above, and for reasons already explained, the indicating mechanism, printing mechanism, and cash drawer have been omitted from this specification.

The key levers are all pivoted on a main supporting rod 40 extending between the side frames 30 and 31. The forward ends of said key levers project through vertical slots 41 in the breast of the cabinet 34 and carry the usual designating key tops. As viewed in Fig. 2, the key checks or tops are arranged in two levels for compactness and for clearance. In Fig. 1, the key tops appear in their regular positions; however, in Fig. 12, the relative positions of the key tops are distorted so that the lower keys appear drawn forward clear of the upper key tops for the sake of illustrative clearness.

As is customary in this type of machine, a universal key coupler 42 (Figs. 2, 5, 7 and 13) cooperates with all of the key levers 35, 36, 37, 38 and 39 to restore them to normal positions after they have been fully depressed, the key coupler also actuating certain elements of the machine, as will be described later. The key coupler 42 extends across the machine in rear of the main supporting rod 40 and just above the rear arms of the key levers. It rocks on pintles 43 and 44 (Fig. 7) projecting inwardly from the side frames 30 and 31, respectively. The lower edge of the key coupler 42 is extended rearwardly, as usual, to form a lip or ledge 45 resting upon the rear arms of the key levers and in line with recesses 46 formed in the enlarged head in which the rear arm of each key lever terminates. When one key, or a key in each bank or group is depressed, it rocks the key coupler upwardly in clockwise direction, and due to the difference in centers of the key coupler and key lever, respectively, the lip or ledge 45 of the key coupler enters the notch or recess 46 in the rear ends of the depressed keys to couple the keys together. At the same time, the lip or ledge 45 passes upwardly in front of an arcuate surface formed on each of the undepressed keys, to lock such keys against depression after the operated keys have advanced a certain distance. An interlock (not shown) prevents depression of more than one key in each bank at one time.

*Differential mechanism*

There is a differentially movable element associated with and actuated by each denominational group of amount keys 35 and 36 and by the key 37. In the particular machine selected to illustrate the present invention, there are a few slight differences in the manner in which the movements of the amount keys of the respective denominational groups are transmitted to the respective differentially movable denominational elements. However, since these differences are merely mechanical, it is thought that a description of one of said differentials will be sufficient. The tens of cents group and the differential mechanism therefor have been selected to illustrate one form of the several differential mechanisms employed in the present invention.

Figure 18:
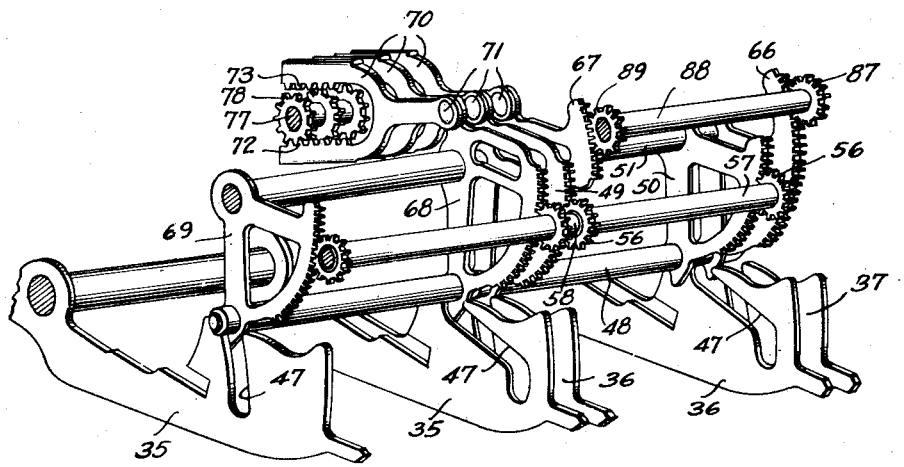
Fig. 18 is a view similar to Fig. 3, showing the connections between the various groups of keys and the totalizer.

The heads formed on the rear ends of each of the keys of each group or bank are differentially cam slotted, as at 47, to variously actuate the respective differential mechanisms according to the particular keys depressed. In the tens of cents group (Figs. 2, 3 and 18) depression of a key 36 engages its cam slot 47 in the rear end of the key with a universal bar 48 extending over the heads of keys representing values from 20¢ to 80¢ of such denominational group, and carried between two toothed segments 49 and 50 pivoted on a rod 51, extending between the side frames 30 and 31, to rock the bail formed by the segments 49 and 50 and bar 48 a distance corresponding to the value of the key depressed. The bar 48 is rotatably mounted on studs 54 and 55 (see also Fig. 15), projecting inwardly from the segments 49 and 50.

The 10¢ and the 90¢ keys of this denominational group, do not cooperate with the bar 48, since they are located to the right and to the left of the segments 49 and 50, respectively, as viewed from the front of the machine, and the slots 47 in these keys engage rollers 52 and 53 respectively, mounted on the studs 54 and 55 (see also Fig. 15), projecting outwardly from their respective segments 49 and 50.

Since the bar 48 does not hold the segments 49 and 50 rigidly together, it is necessary to provide other means to insure uniform movement of these segments. When, for instance, the 90-cent key (Fig. 3) is depressed, its slot 47 engages the roller 53 on segment 50 to advance the differential frame, including the bar 48 and the segments 49 and 50, nine steps or divisions of movement, but due to the looseness of the mounting of the rotatable bar 48 between the segments 49 and 50, the segment 49 has a tendency to lag, thereby throwing a torsional strain on the segments and on the bar 48. This torsional strain is eliminated by the use of a pair of pinions 56, secured to a sleeve 57, journaled on a rod 58 supported in the side frames 30 and 31, parallel with the bar 48 and meshing with the respective toothed segments 49 and 50. Obviously, rotation of the segment 50 is communicated by the pinions 56 and tube 57 to the segment 49, and causes this segment to move a distance exactly equal to the extent of movement imparted to segment 50 by depression of a key 36, and vice versa, when the 10-cent key is depressed, displacement or racking of the parts due to torsional strain is similarly overcome, and uniform movement assured.

The depressed key 36 upon its return movement, restores the differential frame to its normal position where it is arrested by a toe 59 (Fig. 2) on the segment 50 striking a stud 60 projecting laterally from the head on the rear arm of the 90-cent key 36. The stud 60 arrests movement of the bail with the bar 48 and rollers 53 and 54 in alignment with the mouths of the slots 47. A similar toe 59 may be provided on the segment 49 to contact a stud 60 on the 10-cent key. The free ends of the rear arms of the keys may be extended to enter vertical slots formed in a cross brace 29 and to cooperate with the interlocking fingers 27 in the usual manner.

A zero stop arm is provided in connection with each bank or group of keys to prevent movement of the differential frame out of its zero position when no key in the particular denominational group is depressed. The forward end of the rearwardly extending stop arm 61 (Fig. 13) is pivoted on the main cross rod 40 concentric with the key levers, the free rear end of the stop arm terminating in a hook 62, the bill of which normally lies in the path of the bail bar 48 to prevent clockwise movement thereof until a key is depressed in that particular bank. The lip 45 of the key coupler bar 42 rests on the upper edge of the stop arm 61 in the same manner as upon the rear arms of the keys 36.

In order to enable any key 36 in its group to displace the stop arm 61 associated with such group, prior to actuating the differential frame, a short dwell is formed at the open end of each slot 47 in the head of each amount key 36 to permit a slight movement of the key relatively to the bar 48 at the beginning of operation of the key.

And to enable any key 36 in a group to displace the single stop arm 61 associated with that particular group, there is provided a yoke 63, the arms 64 of which are journaled on the main supporting cross rod 40. The yoke extends across and rests upon all of the rear arms of the key levers 36 of its group and over the stop arm 61. At a point immediately over the stop arm 61, the yoke 63 is provided with a transversely extending slot open at its forward end in which lies a hook 65 projecting upwardly from the body of the stop arm 61, the free end of which takes over the yoke 63, and prevents lateral play thereof. Depression of any key 36 raises the rear arm thereof and rocks the yoke 63 which, through the hook 65, raises the stop arm 61 to free the differential actuator.

In the present example selected as an illustration of this invention, there is shown but a single amount key for the hundreds of cents or units of dollars bank.

Hence it is not necessary or convenient to provide a wide yoke 63 to enable the single amount key 37 to displace the corresponding denominational zero stop arm 61, it being sufficient merely to provide the stop arm 61 with a laterally projecting lip (Fig. 12) overlying the rear arm of the amount key 37, to enable the key, when depressed, to displace its stop arm 61.

When a key 36 has been depressed to its full extent, which displaces the stop arm 61, and then released, gravitation, acting upon the key coupler 42, restores both the depressed key 36 and the zero stop arm 61 to their normal positions.

A differential actuating mechanism comprising a pair of segments similar to the segments 49 and 50, and a rotating bar, similar to the bar 48, extending therebetween, is provided to cooperate with the keys 35 (Figs. 1, 12 and 8) of the units of cents bank of keys. Also, if the machine were extended to include a full complement of the units of dollars keys and additional banks of keys, similar mechanism would be provided for such banks. In the machine of the present invention, however, there is only one units of dollars key 37. The differential slot 47 of this key actuates a differential segment 66, (Fig. 18) pivoted on the rod 51.

The movements of the differential actuating mechanisms are transmitted to totalizer actuators to accumulate on the totalizer the amount corresponding to the values of the particular keys depressed. There is a totalizer actuator for each denominational actuating mechanism, the same including forked drivers 70 (Figs. 2, 3, 8, 9 and 18) pivoted at 71 to ears projecting from the segments 49, 67 and 68, the lower prongs of the forks carrying adding racks 72, and the upper prongs of the forks having totalizing racks 73 thereon.

Each forked driver 70 embraces its respective pinion 78 rotatably mounted on a supporting shaft 77 journaled at its opposite ends in the side frames 30 and 31.

The units of cents segments 68 and 69 (Fig. 18), actuate their driver 70 through the segment 68 being directly connected thereto. The tens of cents segments actuate their driver 70 through the segment 49 being directly connected thereto.

The dollar segment 66 operates its driver 70 by rotating a pinion 87 meshed therewith and secured to a short shaft 88, journaled in parts of the machine framework, and having secured on its other end a pinion 89, meshing with the segment 67. The segment 67 is directly connected to its driver 70 at 71. By this arrangement it is possible to place the three drivers 70 side by side. A flange 74 (Figs. 2 and 3) extending longitudinally of and projecting laterally from the upper prong of each driver 70, cooperates with a wing 75 of its associated shifting cam 76 fast on the shaft 77, to normally hold the adding rack 72 in mesh with its pinion 78. To each of these pinions 78 is secured a totalizer actuator 79. A flange 81 similar to the flange 74, and extending from the lower prong of each of the forked drivers 70, cooperates with a second wing 80 secured to the associated shifting cam 76 and located diametrically opposite the wing 75.

The differential segment 49, when rocked clockwise by the depression of an amount key 36, advances the forked rack driver 70 towards the front of the machine, the driver 70 being guided in its movement by the flanges 74 and 81 straddling the shifting cam 76. The rack 72 being in mesh with its pinion 78, such advance of the driver 70 rotates the pinion and the totalizer actuator 79 in counter-clockwise direction a distance corresponding to the value of the particular key 36 depressed, as determined by the position and degree of incline of the cam slot 47 of the key. However, just before the totalizer actuator 79 starts to move, mechanism, to be later described, operates to engage the corresponding totalizer wheels 82, 83 with the totalizer actuator 79 so that, as the totalizer actuator rotates in counter-clockwise direction, it turns the totalizer wheels a corresponding distance, depending upon the value of the keys 36 depressed. As soon as the differential movement of the totalizer actuator 79 is completed, the totalizer engaging mechanism above referred to acts to disengage the totalizer from its actuator, after which the key coupler 42, by restoring the depressed key to its normal position, rocks the differential frame, including the segments 49 and 50 counter-clockwise to normal. The differential frame, on its return, draws the forked driver 70 rearwardly, which movement is communicated through the rack 72 and pinion 78 to the totalizer actuator 79 to turn the latter clockwise to its normal position. It is to be understood that there is a unit of mechanism comprising a forked driver 70 with its adding and totalizing racks 72 and 73, pinion 78, totalizer actuator 79, and shifting cam 76, for each denominational bank of keys, and also one for each of the overflow totalizer wheels.

*Totalizer*

Only one totalizer is illustrated in the drawings, although by slight changes and the addition of a few parts, additional totalizers may be incorporated in the machine of the present invention. It is, therefore, not intended to limit the invention to but one totalizer. However, as the totalizers are of the same general type and construction, it is thought that a description of one of said totalizers will suffice.

The totalizer shown includes a plurality of pairs of gears 82 and 83, (Figs. 1, 2 and 4), rotatably supported on rods 90 and 91, respectively, the rods being mounted at their opposite ends in side plates 92 and 93, which side plates, in turn are freely supported on a shifting shaft 94 extending through the side plates. Rollers 95 on the opposite ends of the shaft 94 normally lie at the upper ends of guide slots 96 formed in cam brackets 97 fixed to the inner faces of the intermediate or sub-frames 101 and 102 (Figs. 1 and 2), respectively. Arms 99 fast on the totalizer shifting shaft 94 carry projections or rolls 98 which project into cam slots 100 also formed in the cam plates 97, to support the shifting shaft 94 and the totalizer frame. The sub-frames 101 and 102 are supported at their rear ends on the shaft 51, and at their front ends, by ears projecting rearwardly from the cross bar 105 which forms the front brace between the side frames 31, 32 of the machine. The totalizer frame side plates 92 and 93 are bifurcated at their lower ends (see dotted lines in Fig. 4) to embrace studs 103 projecting inwardly from the sub-frames 101 and 102, and from which depend the swinging arms 104 of a rocking bail, the purpose of which will be described later.

From the foregoing, it is obvious that the stationarily mounted sub-frames 101 and 102 support between them the shiftable totalizer frame comprising the side plates 92 and 93 connected by the totalizer shifting shaft 94, and by the rods 90 and 91 on which the series of gears 82 and 83 are respectively journaled. The studs 103 serve to guide the side plates 92 and 93 as the totalizer frame, of which they form a part, is shifted to engage the totalizer gears 82 with and disengage them from their totalizer actuator gears 79.

Mechanism rocks the arms 99 and shifting shaft 94 alternately in opposite directions to engage the totalizer gears 82 with and disengage them from their respective totalizer actuator wheels 79.

The totalizer which is normally disengaged from the actuator wheels 79, is first shifted into engagement with the totalizer actuators at the proper time during the operation of the machine. The amount is then added onto the totalizer, or the totals taken therefrom, after which the totalizer is restored to its normal disengaged position.

*Totalizer engaging mechanism*

Figure 4:
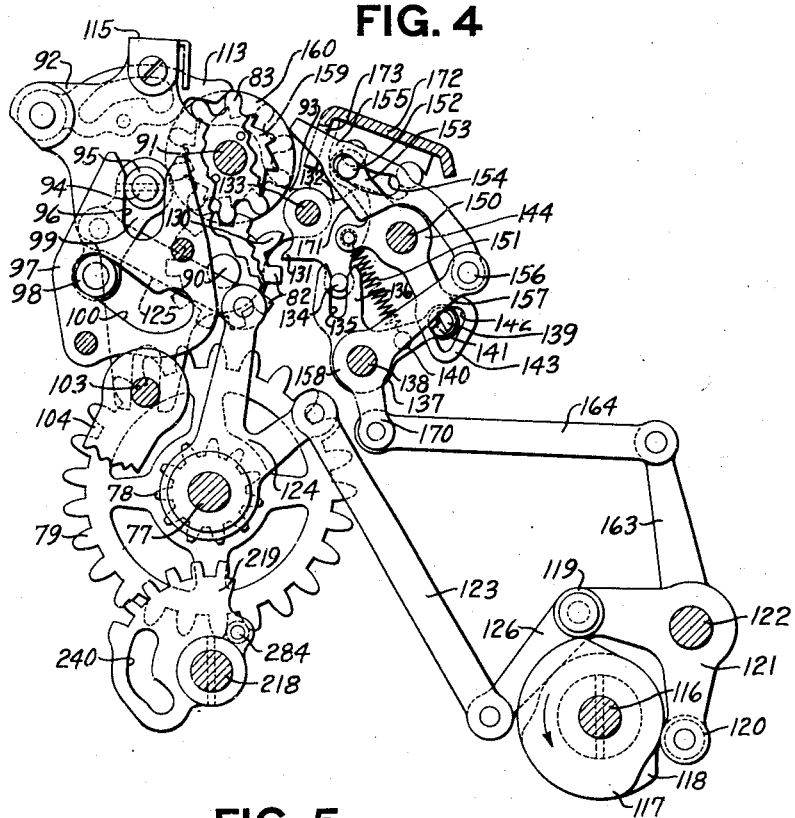
Fig. 4 is an enlarged detail side view of the totalizer engaging mechanism and the transfer or carrying device.

To accomplish the engagement and disengagement of the totalizers relatively to their actuator wheels 79, motion is transmitted from the key or keys depressed to a universal drive shaft 116 (Figs. 2, 4, 5 and 6), and from the drive shaft to the totalizer shifting mechanism (Fig. 4). The drive shaft 116 makes one complete rotation in counter-clockwise direction at each complete operation of the machine, consisting of the depression and return of a key or keys. Such rotations of the drive shaft 116 are intermittent, depending upon the operation of the keys, and are always in one direction.

As heretofore stated, the key coupler 42 extending transversely across the keys, swings on trunnions 43, 44 journaled in the main side frames 30 and 31. Depression of a key to its limit of travel rocks the key coupler upwardly in clockwise direction, and upon removal of the operator's finger from the key, the weight of the key coupler and other working parts of the machine, causes the return of the key coupler in counter-clockwise direction to its home position.

The key coupler is constructed in sections for manufacturing purposes, and to permit removal of the operating mechanism as a unit without necessitating the disassembly of the entire machine. To this end, the key coupler 42 has mounted thereon a bar 175 (Figs. 5 and 7) secured to and resting upon the top of the key coupler, with its lower edge projecting rearwardly beyond the rear face of the key coupler 42 to form an overhanging ledge 185 (Figs. 11 and 13). Bearings 177 and 178 (Fig. 7) formed in the free ends of lugs projecting forwardly from the bar section 175 of the key coupler carry a shaft 176 journaled therein. The bar 175, swings with the key coupler 42 as the latter rocks, the shaft 176 being in axial alignment with the trunnions 43 and 44 which support the key coupler 42. It will be noted, therefore, that the oscillatory movement of the bar 175 is concentric with that of the key coupler 42. The shaft 176 is free in the bearings 177 and 178, and is additionally connected to the bar 175 by the hooked rear ends 181 and 182 of transmitting arms 179 and 180 fast on shaft 176 and guided in grooves formed transversely of the bar 175, the lower edges of the transmitting arms being spaced above the bottoms of the guide grooves, as shown in Fig. 11.

The transmitting arms 179 and 180, which are directly connected with the operating mechanism of the machine to transmit power thereto, extend across wells formed in the key coupler 42 and the bar 175. These wells constitute seats for springs 183 and 184 (Figs. 7 and 13) which press the arms upwardly to cause their hooked ends 181 and 182 to bear against the overhanging edge 185 of the bar 175. By reference to Fig. 13, it is obvious that sudden depression of a key 36 starts the key coupler 42 equally as suddenly on its upward movement, and because of the inertia of the operating mechanism, and the transmitting arms 179 and 180, the key coupler rises relatively thereto, compressing the springs 183 and 184, and loosening the engagement of the hooked arms 179 and 180 with the overhanging edge 185. Were the springs 183 and 184 not employed, the shock of this sudden movement would be transmitted to practically the entire operating mechanism of the machine, thereby creating tremendous strain on the several operating parts. The springs 183 and 184, however, absorb the sudden jar and jerk otherwise incident to such a starting of the key coupler 42, the springs merely compressing to transmit the power smoothly to the operating mechanism. The temporary lag thus caused in the several operating mechanisms results in no error during adding operations, since the springs 183 and 184 are strong enough to carry the normal load of the operating mechanism during adding operations and very shortly after the machine is started, they recover and again press the hooks 181 and 182 of the transmitting arms 179 and 180 against the overhanging edge 185 of the bar 175 on the key coupler.

During adding operations the totalizer actuators are positively adjusted by the cam slots 47 in the rear ends of the keys 35, 36, and 37, as heretofore explained. Thus the lag which may be caused by the cushion driving connections including the springs 183 cannot introduce an error in the amount entered into the totalizer elements. The dwells at the mouths of the cam slots 47 are sufficient to enable the totalizer to engage the actuators before the actuators are operated, even though the maximum lag is present in this engaging mechanism. The transfer mechanism, hereinafter described, is not operated until after the amounts are entered, and the totalizer is disengaged, and therefore, the lag in the transfer mechanism cannot cause an error in the entering of a tens carry.

Not only do these springs cushion the shock of the sudden starting, but if, during the operation of the machine, the load should vary, as it usually does in machines of this type, the springs 183 and 184 act to absorb the variances of the load and make for smoother key action throughout the operation.

The shaft 176 rocking with the key coupler 42, 175, carries a branched driving arm 191 (Figs. 5, 6 and 7) fast thereon, to one branch of which is pivoted, at 189, the stem of a forked driving element 190. The respective tines of the driving element 190 carry racks 192 and 193 opposed to each other and embracing a pinion 194 fast on the drive shaft 116, with which pinion the racks alternately engage. In its normal position, that is, in the position in which the driving element 190 is left at the end of an operation, its rack 192 is in mesh with the pinion 194, being held in this position by a spring-urged retaining arm 195 pivoted on a stud 196 projecting laterally from the sub-frame 101, and pressing against a stud 197 on the driving element.

When the parts are in their home positions, the drive arm 191 presses an aligner finger 198, projecting therefrom from one branch of the arm, into a recess in the periphery of an aligner disk 199 fast to the side of the pinion 194 on the shaft 116 to hold the shaft in its home position.

Figure 5:
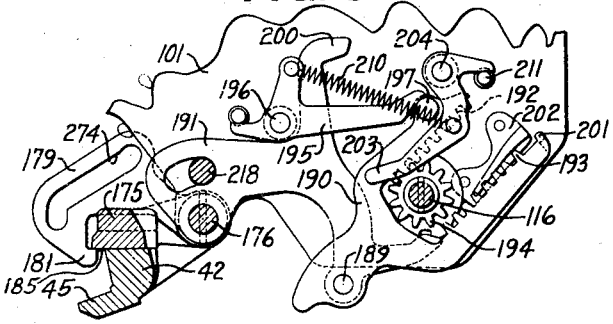
Fig. 5 is a detail side view of the drive shaft actuating means.
Figure 6:
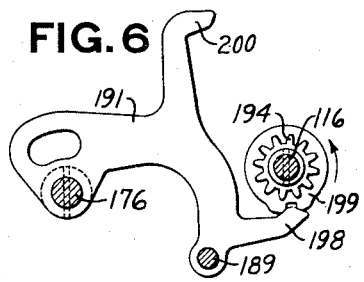
Fig. 6 is a detail side view of the drive shaft aligner.
Figure 7:
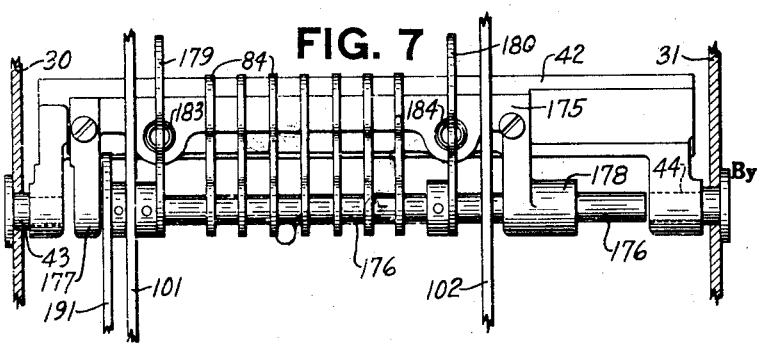
Fig. 7 is a top plan view of the key coupler and a part of the operating mechanism.

Depression of any of the amount keys 35, 36, or 37, operates through the key coupler 42 to rock the shaft 176 and drive arm 191 clockwise to draw the forked driving element 190 downwardly (as viewed in Fig. 5). Since the rack 192 is in mesh with the pinion 194 at the commencement of the operation, the downward movement of the rack 192 imparts 180 degrees of rotation in counter-clockwise direction to the pinion 194 and to the shaft 116.

As the drive arm 191 swings clockwise, a second aligning finger 200 projecting upwardly from another branch of the arm 191, approaches the periphery of the aligner disk 199, which, at this time, is being rotated by the rack 192. The downward movement of the aligning finger 200 and the rotation of the disk 199 are synchronized so that the recess in the periphery of the disk is just under the tip of the finger 200 as the finger reaches the lowermost point of its travel. At this time, also, the key is at its lowermost point of depression, and the key coupler 42 is at its highest limit of travel, ready, as soon as the pressure is removed from the key, to reverse its direction of movement, restoring the depressed key and continuing the operation of the machine to completion. Also at this time, the driving element 190 is rocked on its pivot 189 to disengage the rack 192 from the pinion 194, and to engage the rack 193 therewith. The purpose of the second aligner finger 200, therefore, is to hold the drive shaft 116 in proper alignment while the driving element 190 is being shifted.

As the driving element 190 is drawn downwardly by the driving arm 191, a lug 201, (Figs. 1 and 5), projecting laterally from the free end of the rack 193, slides along the under surface of a guide rib 202 secured to the side of the sub-frame 101, to hold the rack 192 in mesh with the pinion 194 by restraining the driving element 190 against rocking in counter-clockwise direction. The under surface of the guide rib 202 is curved to compensate for the curved path of the pivot point 189 of the driving element 190. As the driving element 190 starts downwardly, its stud 197 escapes the retaining arm 195, which would free the forked driving element for counter-clockwise rocking before its downward travel was completed, were it not that just prior to the escape of the stud 197 from the retaining arm 195, the lug 201 contacts the guide rib 202, to preserve the engagement of the rack 192 with the pinion 194.

As the driving element 190 approaches the end of its downward travel, the stud 197 on the rack 192 strikes the cam edge of a spring-urged shifting arm 203 pivoted on a stud 204 in the sub-frame 101, and rocks this arm counter-clockwise against the tension of its spring 210. At the very end of the downward movement of the driving element 190, the lug 201 clears the lower end of the guide rib 202, whereupon the spring 210, now under greater tension, rocks the shifting arm 203 clockwise about its pivot 204 until a stud 211 in the path of a tail on the shifting arm arrests said arm.

The shifting arm 203 as it rocks clockwise, shifts the driving element 190 counter-clockwise to unmesh rack 192 from the pinion 194, and to mesh rack 193 with said pinion. The depressed key has now reached the bottom of the stroke, and as pressure is removed from the key by the operator, the weight of the key coupler 42 rotates the shaft 176 and driving arm 191 counter-clockwise to force the drive element 190 upwardly, and, since rack 193 is now in mesh with the pinion 194, the pinion and shaft 116 continue their counter-clockwise rotation. When the driving element 190 completes its downward movement and is rocked by the spring 210 to disengage the rack 192 from the pinion 194, and mesh the rack 193 therewith the lug 201 shifts counter-clockwise past the lower end of the guide rib 202. Then, upon upward travel of the driving element 190, the lug 201 rides along the upper surface of the guide rib to maintain the rack 193 in mesh with the pinion 194. As the driving element 190 approaches the end of its upward travel, the stud 197 carried thereby contacts with and rocks the retaining arm 195 in counter-clockwise direction against the tension of the spring 210, and as the driving element 190 arrives at the upper limit of its travel, the lug 201 clears the upper end of the guide rib 202, whereupon the spring 210 immediately rocks the retaining arm 195 clockwise, thereby rocking the driving element 190 also clockwise to unmesh rack 193 from pinions 194, and mesh the rack 192 therewith. This shifting of the driving element 190 occurs at the very end of the operation of the machine.

The drive shaft 116 (Fig. 4) is journaled in the sub-frames 101 and 102, and carries a pair of cams 117 and 118 fast thereon to co-act with rollers 119 and 120, respectively, on the respective arms of a bell crank 121 pivoted on a cross rod 122 supported between the sub-frames 101 and 102. The drive shaft 116, during its complete rotation in counter-clockwise direction at each operation of the machine, causes the cams 117 and 118 to rock the bell crank 121 first counter-clockwise and then, later in the operation, after an intervening dwell, the cams restore the bell crank clockwise to normal. A link 123 connects the arm 126 of the bell crank 121 to one arm of a bell crank 124 pivoted on the supporting shaft 77, the other arm of said bell crank 124 being connected by a link 125 to one of the arms 99 on the totalizer shifting shaft 94.

Counter-clockwise rotation of the bell crank 121 by the cams 117 and 118 as just described, operates through the linkage to rock the arm 99 and totalizer shifting shaft 94 counter-clockwise to draw the free end of the arm 99 along the inclined cam slot 100, and shift the shaft 94 and the totalizer frame downwardly to engage the totalizer gears 82 with their actuator wheels 79, the shaft 94 being guided as to its vertical movement at its opposite ends by the slots 96 in the cam slotted plates 97, as well as turning axially due to the ends of the arms 99 traversing the cam slots 100.

From the foregoing it will be understood that, upon depression of an amount key 35, 36, or 37, the key coupler 42 is rocked clockwise and with it the driving arm 191 (Figs. 5–7) to rotate the drive shaft 116, and, through the linkage shown in Fig. 4, effect the engagement of the totalizer gears 82 (Figs. 2 and 4) with their actuator wheels 79.

Due to the arrangement of leverages between the key coupler 42 (Fig. 5) and the main drive shaft 116, the shaft is quickly started, and the cams 117 and 118 (Fig. 4) are so shaped as to immediately impart motion to the linkage leading to the totalizer shifting shaft 94 to engage the totalizer gears with their actuator wheels prior to the clockwise travel of the differential segments (Fig. 2), which actuate the forked racks 70 and the totalizer actuator wheels 79.

The cams 117 and 118 (Fig. 4) are so formed that during the major portion of each of their two steps of rotation they maintain the totalizer in its engaged or disengaged position relatively to the actuator wheels 79.

Thus a key, at the first portion of its movement, starts to rock the key coupler 42, which, in turn, starts to rotate the main drive shaft 116, and the cams 117 and 118 shift the totalizer into mesh with its actuators. Thereafter, until near the end of the down stroke of the key and the consequent continued rotation of the drive shaft 116 throughout its first step, the cams 117 and 118 maintain the totalizer in its engaged position.

The dwell at the upper open end of the differential slot 47 of each amount key 35, 36, or 37 enables the totalizer shifting mechanism to engage the totalizer gears 82 with their actuators 79 prior to the commencement of the operation of the differential segments by the keys.

As the key approaches the limit of its down stroke, the inner end of its differential slot 47 is fitted around the universal bar 48, or the rolls 52 or 53 on the ends thereof. Such inner ends of the slots form dwells which impart no additional throw to the differential segments, but afford the key a slight farther travel after the differential rack has been positioned.

Such farther or extra travel of the key is utilized to enable the key to rock the key coupler 42 to its extreme limit of travel which is sufficient to drive the cams 117 and 118 to the end of their first step of movement, during which the cams operate connections 123, 124, etc., to quickly disengage the totalizer gears 82 from their actuator wheels 79.

Hence, the totalizer is engaged with its actuators at the beginning of the downward travel of the key, and is disengaged therefrom at the end of such downward travel.

Obviously, the differential travel is imparted by the amount keys 35, 36, 37 to the totalizer actuators 79 between the time of engagement of the totalizer gears 82 therewith and their disengagement therefrom.

Totalizer aliner

The rocking movement of the shifting shaft 94 is also utilized to disengage and reengage aliners with the totalizer gears 83. A series of arms 111 (Fig. 2) fast on the totalizer shifting shaft 94 carry studs 110 which project into cam slots 112, formed in a series of spring urged aliner detents 113 pivoted on the rod 114 extending between the totalizer side plates 92 and 93, which detents engage their respective totalizer gears to prevent accidental rotation thereof when the machine is at rest. There is an aliner arm 113 for each of the totalizer gears 83. When the totalizer shifting shaft 94 rocks counter-clockwise, as viewed in Fig. 2, to engage the totalizer gears 82 with the actuator wheels 79, the arms 111 rocking with the shaft 94, force the studs 110 towards the rear ends of the cam slots 112, the configurations of which are such that the aliners 113 are thereby rocked upwardly counter-clockwise against the tension of their springs to disengage the noses thereof from the teeth of the totalizer gears 83. Then after the amount has been accumulated on the totalizer, and when the totalizer shifting shaft 94 rocks clockwise to disengage the totalizer gears 82 from the actuator wheels 79, the arms 111 advance the studs 110 towards the front ends of slots 112 to return the aliner detents 113 towards their respective totalizer gears 83 to enable the springs 109 to complete the engagement of the detent with their totalizer gears. A flanged guide bar 115, secured at its opposite ends to the totalizer side plates 92 and 93, has its flange slotted to form a comb, the aliner detents 113 fitting in the slots in the flange, which serves to hold the aliner detents against lateral movement, and retain them in the same planes with their respective totalizer wheels 83.

The forward end of each of the cam slots 112 terminates in a recess, shown in dotted lines in Fig. 2, which normally occupies a position just below its stud 110. This recess is to permit movement of the detent 113 independently of the stud 110 when the totalizer gear 83 is actuated by the transfer or carry-over device after the disengagement of the totalizer gears 82 from the actuators 79 as will be later described. The cam slots 112 are so shaped that the aliner detents are not rocked out of engagement with the gears 83 until after the gears 82 are in mesh with the actuator wheels 79. Likewise, the aliners 113 are moved into engagement with the totalizer gears 83 just before the totalizer is disengaged from its actuator wheels.

Over-rotation preventing detent

The totalizer actuators 79 are differentially positioned when an amount key or a total key is depressed. If a key is depressed quickly and with undue force, especially a higher value key, it might be possible to whip its totalizer actuator 79 beyond the proper differential position, thereby causing an over addition to be made on the totalizer and an incorrect total would result.

To obviate this, an over-rotation preventing detent is provided for each of the totalizer actuators 79 to check them as they arrive at their adjusted positions. Conveniently such a detent may comprise an arm 84 (Figs. 2 and 7) mounted on the key-coupler shaft 176 and extending over the key coupler towards the rear of the machine. These arms, one for each totalizer actuator, rest in grooves 85 cut across the top of the bar 175 on the key coupler 42, and at their rear ends are provided with downwardly extending hooks 86 embracing the bar 175 so that they are raised and lowered therewith. Upwardly projecting teeth 87 on the upper edges of the arms 84 are adapted, when the key coupler 42 approaches the limit of its upward movement, to engage the teeth of the respective actuators 79 at the instant of the completion of their differential movement to hold said actuators against further movement due to the momentum developed by the several parts during depression of a key or keys.

Upon removal of the pressure on the key, the key coupler returns in counter-clockwise direction to its home position, and withdraws the over-rotation preventing detents 84 from totalizer actuator wheels 79 to free them for differential positioning on the next operation of the machine.

As the depressed key restores to its normal position due to the weight of the key coupler thereon, its differential slot 47 causes the differential bail to return to home position and withdraw the forked rack 70 to its home position.

The rack 70 on such withdrawal reversely rotates the totalizer-actuator wheel 79, but as the totalizer gear 82 has already been disengaged therefrom, such reverse rotation is idle.

The key coupler, on its restoration, swings the driving arm 191 counter-clockwise to its normal position and forces the forked drive element 190 upwardly to complete the rotation of the drive shaft 116 and bring the cams 117, 118 to position to actuate the shiftable totalizer frame at the beginning of the next operation of the machine.

Transfer or carry-over device

When a totalizer wheel 160 exceeds its capacity, that is, when it passes from "9" to "0", it is necessary to effect a transfer, that is, to add a single unit on the totalizer wheel 160 of next higher denomination. In other words, when the units of cents wheel, for example, passes from "nine" to "zero", mechanism must be provided which, under the control of the units of cents wheel will cause "1" to be added into the tens of cents wheel.

One of the features of novelty embodied in the present transfer device, is that the totalizer gears 82 journaled on the rod 90 trip their respective transfer devices which actuate the totalizer gears 83 of the next higher orders journaled on the shaft 91 to advance these gears one step together with the gears 82 of the same denomination on the shaft 90. An explanation of one transfer mechanism will suffice.

The transfer mechanism is controlled by elongated tripping teeth 130 (Fig. 4) carried by the totalizer gears 82 on the rod 90. The tripping tooth 130 on the units of cents gear 82, as the gear turns clockwise from "9" to "0", wipes past a projection 131 on an angularly shaped trip pawl 132 pivoted on a rod 133 extending between the totalizer side plates 92 and 93 of the shiftable totalizer frame. Since the rod 133 is carried by the side plates 92 and 93, it, and consequently the trip pawls 132, one for each totalizer element, move with the totalizer when the latter is shifted into engagement with its actuators. As the totalizer engages the actuators, laterally extending studs 134 on the trip pawls 132 move downwardly in slots 135 formed in the arms 136 of latching bell cranks 137 pivoted on a stationary rod 138 extending between the subframes 101 and 102. The slots 135 are parallel to the movement of the totalizer as it shifts into and out of engagement with the actuators 79, and consequently the up-and-down movement of the totalizer does not displace the trip pawls 132. After the totalizer is engaged with its actuators and the studs 134 rest near the bottom of the slots 135 continued depression of an amount key 35, 36 or 37 drives the totalizer actuators 79, as described above, to rotate the totalizer gears 82 now in mesh therewith. As illustrated in Fig. 4 the gear 82 (e. g. the units gear) stands at "9", so that adding movement of one step thereof in clockwise direction, will cause the tripping tooth 139 to wipe past the projection 131 on the trip pawl 132 in its adding movement from "9" to the "zero" position, as illustrated in Fig. 2.

The high tooth 130, in passing the projection 131, rocks its trip pawl 132 in counter-clockwise direction, which, through stud 134 and slot 135, rocks its latching bell crank 137 clockwise to remove a flattened stud 139 on the remaining arm 140 of the latching bell crank 137, from the path of a shoulder 141 in the wall of an opening 142 formed in an arm 143 of a control lever 144. This control lever is pivoted on a stationary rod 150 supported in sub-frames 101 and 102, there being as many control levers as there are latching bell cranks 137. When the stud 139 is removed from the path of the shoulder 141, a spring 151 rocks the control lever 144 in counterclockwise direction, such rocking movement being limited by contact of the wall of the opening 142 with the stud 139. A lateral guide stud 152 on the remaining arm 153 of the control lever 144 projects into a curved slot 154 formed intermediate the ends of a transfer pawl 155 pivoted at one end at 156 to one arm 157 of an actuating lever 158 pivoted on the cross rod 138, the free end of the transfer pawl lying adjacent the totalizer wheel 83 of next higher denomination. When the spring 151 rocks the control lever 144 counter-clockwise, the stud 152 lowers the transfer pawl 155 to position the free end thereof in front of a ratchet 159 (Fig. 4) fast to the side of the totalizer gear 83 of the next higher order, that is, the tens of cents wheel, and to a reading wheel 160. The totalizer gear 83, transfer ratchet 159 and engraved reading wheel 160 are secured together and rotate as a unit.

The transfer mechanism just described is tripped while the totalizer is engaged with the totalizer actuators 79 and while the totalizer gears 82 are being rotated to accumulate amounts thereon. However, the transfer itself does not occur until after the totalizer is disengaged from its actuators. After the totalizer is moved out of engagement with the actuators 79, a pair of cams 161 and 162 (Fig. 2) fast on the drive shaft 116 and turning therewith, rocks a multiple-armed lever 163 clockwise, and then almost immediately counter-clockwise to normal. A link 164 connects an upwardly extending arm of the multiple-armed lever 163 with an arm 170 extending downwardly from the actuating lever 158. The lever 163 when moved in clockwise direction draws the link 164 towards the right, as viewed in Figs. 2 and 4, to rock the actuating lever 158 counter-clockwise, thereby forcing the transfer pawl 155 toward the left and, since the transfer pawl 155 was lowered to a position in front of the ratchet 159 when the high tooth 130 tripped the latching bell crank 137, the free end of the transfer pawl picks up the ratchet 159 and advances it one step. This step of movement is transmitted to the totalizer gear 82 on the lower totalizer shaft 90 by the totalizer gear 83 which, it will be remembered, is at all times in mesh with its lower totalizer gear 82.

The lower edge of the transfer pawl 155 is cammed, as at 171, and when the transfer pawl 155 has been lowered to its effective position by the tripping of the bell-crank lever 137, and as the transfer pawl is about completing its effective stroke, the cam 171 rides upon the cross rod 133 to cam the free end of the transfer pawl out of engagement with the ratchet 159.

The pawl 155, when thus cammed upwardly, rocks the control lever 144 clockwise through the slot 154 and pin 152 connection until the shoulder 141 in the wall of the opening 142 clears the flattened stud 139 on arm 141 of the latching bell crank 137, whereupon the spring 151 rocks the latching bell crank 137 counter-clockwise to position the stud 139 in the path of the shoulder 141, to restrain the control lever 144 and the transfer pawl 155 in their normal positions.

It is obvious that the cams 161 and 162 will operate the linkage to rock the actuating levers 157 and the transfer pawls 155 at each operation of the machine regardless of the necessity for a carry, but as long as the latching bell cranks 137 remain in their effective positions, the reciprocations of the transfer pawls 155 will be idle.

To guide the transfer pawls 155 in their reciprocatory movements, a flanged bar 172 supported by the sub-frames 101 and 102 has its flange slotted to form a comb 173 extending downwardly at right angles thereto, the teeth of which comb embrace the transfer pawls 155. This comb also serves to prevent overthrow of the totalizer wheels 160 when a transfer is being made.

When the transfer pawls 155 actuate the totalizer gears 83, the combined action of the cam edges 171 riding up on the rod 133 and of the ratchet wheels 159, as they rotate in counter-clockwise direction, raises the pawls 155 until, just as the ratchets 159 reach the positions to which they are to be advanced, the pawls 155 wedge between the rods 133 and the closed ends of the slots in the comb 173, thereby binding the pawls 155 against further movement.

This binding action also locks the ratchets 159 against rotation in either direction until the cams 161—162 withdraw the transfer pawls 155 to their normal positions. It will be understood that the cams 161 and 162 are so arranged on the shaft 116, as to actuate the transfer pawls 155 successively, commencing with the one of lowest denomination.

A novel and very simple means to prevent accidental or intentional tripping of the transfer devices incident to a heavy jar or from some external source, consists in so pivoting the tripping pawls 132 that their mass is located to the right of the rod 133, upon which they are pivoted. Due to gravitation, the weight of this mass constantly urges the transfer pawls 132 to rotate in clockwise direction about their pivot. This potential energy, through the studs 134 and slots 135 constantly tends to rock the latching bell cranks 137 in counter-clockwise direction to press the latching studs 139 into the paths of the shoulders 141 in the openings 142 of the arms 143, and thereby counteract any tendency of the arms 140 of the latching bell cranks to rock clockwise due to their weight, to remove the studs 139 from the paths of the shoulders 141, which, of course, would trip the transfers.

Totalizing mechanism

When it is desired to print the total accumulated on the totalizer, it is only necessary to depress the total key 39 (Figs. 1, 8, 12 and 14) to its full extent of movement, and then release it. Depression of the total key 39 causes the totalizer wheels 160 to rotate in reverse direction to their "zero" positions, thus clearing the totalizer. The totalizer in reversely rotating to its "clear" position controls the setting of the differential members which, in turn, adjust printing elements (not shown) to represent the amount registered on the totalizer wheels.

In arranging a key-operated machine for total taking and clearing, effected by the depression of a special key, a number of conditions must be accommodated.

In the first place, it will be noted that in the operation of accumulating amounts, the totalizer gear 82 is engaged with and disengaged from the totalizer actuator wheels 79 through the cams 117 and 118 (Fig. 4) and associated mechanism, through the cushioned key-coupler 42 (Figs. 5, 6 and 7) which takes up shocks and jars incident to improper depression of the amount keys.

In taking totals, however, and clearing the machine, it is highly desirable that all parts be operated positively throughout the extent of their movement from and towards normal position.

In order to enable the differential members to operate, it is necessary to place the respective denominational zero stop arms 61 (Fig. 13) under the control of the total key 39, and provide means to enable the total key to effect the engagement and disengagement of the totalizer relatively to its actuators.

To these ends, depression of the total key 39 operates mechanism to disable the zero stop levers 61 and to positively operate the drive shaft 116, but does not directly position the differential members, as do the amount keys. The total key 39, like the amount keys, comprises a lever pivoted intermediate its ends on the main supporting shaft 40, the forward arm of the lever terminating in a key top, and the rearwardly extending arm of the lever passing beneath the key coupler 42 and terminating in a head having a cam slot 215 formed therein.

A convenient means to reverse the direction of rotation of the totalizer gears 82 resides in arranging that the total key shall shift the forked drivers 70, to unmesh the adding racks 72 (Figs. 2, 3 and 8) from the pinions 78 of the actuator wheels 79, and mesh the totalizer racks 73 therewith.

Figure 16:
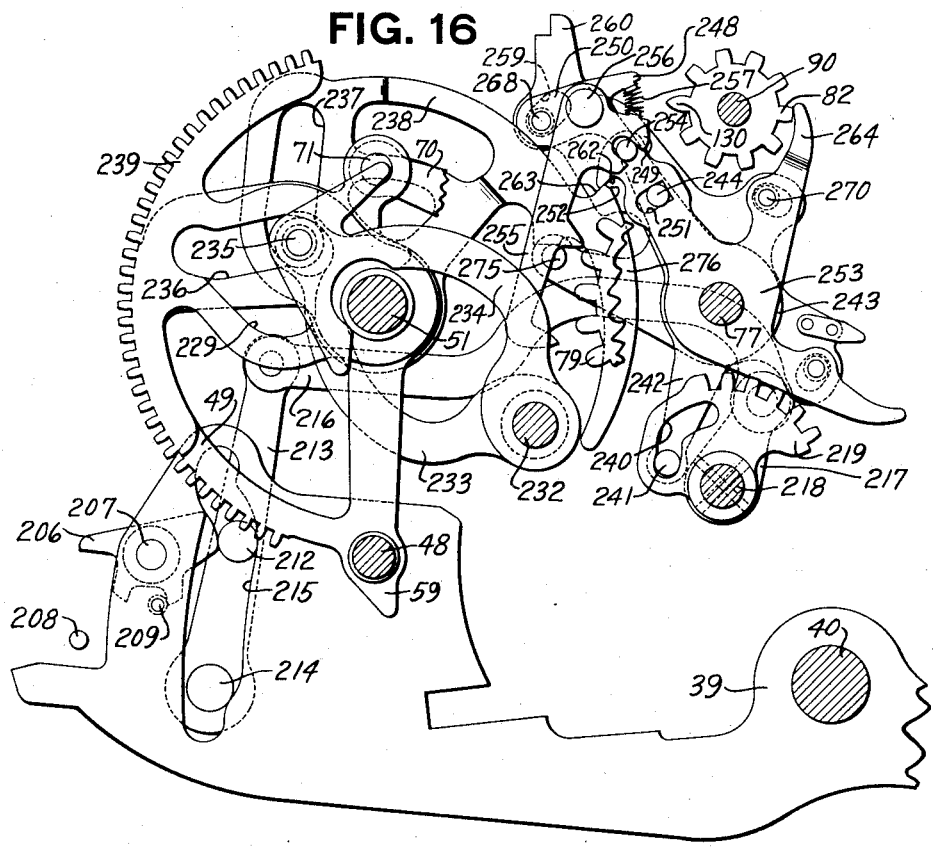
Fig. 16 is a detail side view of the resetting mechanism, showing the positions assumed by the parts immediately after the operator has begun to depress the total key.

To this end, a reversing lever 213, (Fig. 8), pivoted at 214 on the adjacent side frame 31, carries a stud 212 projecting laterally through the cam slot 215. A link 216 connects the upper end of the reversing lever 213 with an arm 217 fast on a reversing shaft 218 journaled in the machine side frames 30 and 31, and in the sub-frames 101 and 102. This reversing shaft extends parallel with and just beneath the shaft 77 supporting the totalizer actuator wheels 79. The shape of the cam slot 215 is such that the total key 39, early in its depression or clockwise movement, (see also Fig. 16), rocks the lever 213 clockwise, which, through the link 216 and arm 217, rocks the reversing shaft 218 also in a clockwise direction.

Reversing segments 219, (Figs. 2, 8 and 10), one for each totalizer wheel, are fast on the reversing shaft 218 and mesh with a corresponding series of segments 220 journaled on the shaft 77, each of the segments 220 being secured to the side of its respective shifting cam 76. In this manner, clockwise movement of the reversing shaft 218 by depression of the total key, as above described, rotates all of the segments 220 counter-clockwise, and since these segments are fast to the shifting cams 76, the latter, with their wings 75 and 80, will also be rocked counter-clockwise. It will be remembered that the wings 75 and 80 coact with the respective flanges 74 and 81 on the forked drivers 70. Consequently, counterclockwise movement of the wings rocks the forked drivers clockwise about their pivots 71 to unmesh the adding racks 72 on the lower prongs of the drivers from the pinions 78 of the actuating wheels 79, and mesh the totalizing racks 73 on the upper prongs of the drivers with said pinions, so that when the forked drivers 70 advance, as hereinafter described, the totalizing racks 73 will rotate the pinions 78 and totalizer actuator gears 79 clockwise to rotate the totalizer gears 82 counter-clockwise, instead of clockwise as in adding.

To rotate the totalizer gears 82 in the reverse direction to their zero positions, after the drivers 70 have been shifted to mesh the racks 73 with the actuator pinions 78, the differential frames are rocked in clockwise direction (Fig. 10) to actuate the drivers 70 and totalizing racks 73. However, since no amount keys are depressed on totalizing operations, other means must be provided to position the segments such as 49 and 50 differentially under the control of the totalizer gears 82. Since the bills 62 of the several denominational zero stop arms 61 normally lie in the paths of the connecting bars such as 48 between the respective pairs of segments, it is first necessary to displace the zero stop arms before the segments can be rocked clockwise. Both of these objects are conveniently accomplished through the provision of a releasing yoke 222 (Figs. 11 to 14) extending across the machine just above the keys, (see Fig. 12), the ends of which yoke are bent at right angles thereto to form arms 223 and 224, pivoted on the main cross rod 40, upon which all the keys are pivoted. The edge of this yoke 222 lies adjacent to shoulders 225 extending upwardly from the hubs of each of the denominational zero stop arms 61. A finger 231 (Fig. 14), projects rearwardly from one arm of the releasing yoke 222 and carries a stud 230 extending laterally across the top of the total key lever 39, so that depression of the total key rocks arms 223 and 224 and releasing yoke 222 clockwise, and the yoke, being in contact with the shoulders 225 on the respective zero stop arms 61, rocks all of said stop arms clockwise to raise their bills 62 out of the paths of the bars 48 etc. of the respective differential frames, to permit movement of the segments 49, 50 etc. by mechanism now to be described.

As heretofore stated, it is desirable to arrange that the total key 39 shall positively actuate the totalizer shifting mechanism without the intervention of the yielding or cushioning action of the key coupler 42 which, due to a possible lag, might prevent the proper synchronism of operation of the parts on total-taking operations.

But, since the shiftable totalizer frames 92 and 93 (Figs. 1 and 4) are operable to engage the totalizer gears 82 with, and to disengage them from the totalizer actuator wheels 79, only through the linkage controlled by the cams 117 and 118 on the drive shaft 116 which latter, in turn, is operable only through the key coupler, it is obvious that means should be provided to positively actuate the drive shaft.

To this end, the release yoke 222 directly operable by the total key 39, is arranged to contact a lug 282 (Fig. 11) formed on the hub of a rearwardly projecting arm 280 journaled on the main supporting rod 40. In shape, the actuating arm 280 is similar to the rear arms of the amount key levers 35, 36 and 37 to interlock with the lip 45 of the key coupler and prevent depression of the total key when an amount key has been depressed.

The actuating arm 280 extends beneath the key coupler 42 and carries a block 281 on which rests a nose 279 depending from the transmitting arm 180, which, it will be remembered is fast on the auxiliary shaft 176 carried by the bar 175 on the key coupler 42. The lip 45 of the key coupler may be slotted, as shown in Fig. 11, to permit access of the nose 279 to the block 280.

Obviously, the total key 39, when depressed to rock the release yoke 222, causes the latter to rock the actuating arm 280 to directly turn the shaft 176 without first operating the cushioned key coupler. Owing to the engagement of the hook 182 with the ledge formed by the bar 175 secured to the key coupler 42, the coupler is rocked with the actuating arm 280, through the transmitting arm 180.

The auxiliary shaft 176, when rocked, transmits movement through the arm 191 (Fig. 5) and forked rack member 190 to the main drive shaft 116, which, through the cams 117 and 118 (Fig. 4), and linkage heretofore explained, shifts the totalizer gears 82 into mesh with the actuator wheels 79, at the beginning of the operation of the total key, and later, shifts the totalizer gears 82 out of engagement with their actuator wheels 79 just as the total key reaches the end of its extent of depression.

As this is effected just as heretofore explained, no additional description is necessary, the engagement of the totalizer gears 82 with their actuator wheels 79 occurring at substantially the same time with the shifting of the reversing segments 219 which effects the disengagement of the adding racks 72 of the forked drivers 70 from the pinions 78 and the engagement of the totalizing racks 73 therewith.

It is now in order to operate the differential frames, including the segments 49 and 50 to adjust the indicators and type carriers (not shown) to indicate and print the amount standing on the totalizer wheel 160 and to clear the totalizer, to effect all of which the forked driving members 70 are actuated and their excursions controlled by the totalizer itself.

As no amount keys are depressed in "taking totals", a special actuating means for the drivers 70 is provided, which actuating means utilizes the transmitting arms 179 and 180 (Figs. 5, 7, 11 and 13) to which is imparted a direct thrust from the total key 39, as just explained.

To this end, the spaced transmitting arms 179 and 180 (Figs. 11 and 13) are each provided with an abruptly inclined cam slot 273 in which to accommodate studs 258 carried at the lower end of each of the arms 104 conveniently pivoted on the guide studs 103 (Figs. 4 and 13) for the shiftable totalizer frame projecting from the opposite sub frames 101 and 102.

Pairs of oppositely bowed companion links 233 and 234, (Figs. 2, 3, 9, 10 and 13), in number equal to the number of totalizer gears 82, are pivotally mounted at their lower ends on a rod 232 carried by and connecting the lower ends of the swinging arms 104.

The lower ends of each pair of companion links 233 and 234 are hubbed to each other (Fig. 3) on the rod 232, the upper ends of the companion links being normally hooked over the cross rod 51 and connected by a stud 235. By oppositely bowing the members of the pairs of companion links, the latter are enabled to operate at the various angles required and to the necessary extents without interference with the other parts of the machine.

The two members of each pair of companion links 233 and 234 are laterally spaced apart to embrace between their sides a denominational group of parts such as the differential segment 49 to which the driver 70 is connected, a controlling sector 238 journaled on the cross rod 51 and an adjustable setting rack 239 likewise journaled on the cross-rod 51.

Segments 239 (Fig. 10) constitute minimum movement devices through the medium of which, indicators (not shown) and type elements (also not shown) are set to respectively indicate and print the amounts entered into the machine on adding operations, and to indicate and print the totals taken from the totalizer on totalizing operations.

For a more complete description of the segment 239, attention is directed to U. S. application, Serial No. 261,996, filed March 15, 1928, in the name of Bernis M. Shipley, now Patent No. 1,804,650, issued May 12, 1931.

The differential segment 49 has a cam slot 236 formed therein, which, when the parts are in their normal positions, lies at a substantial angle to a cam slot 237 formed in the adjacent control sector 238 of its group, and the connecting stud 235 at the upper ends of the companion links 233 and 234 passes through both such cam slots 236 and 237, and through a heart-shaped cam opening 229 formed in the setting rack 239.

During adding operations, the depression of an amount key 35, 36, or 37 actuates its differential segment such as 49 which, through its cam slot 236, swings its companion links 233 and 234 clockwise about the rod 232 as a centre, and the rocking of the key coupler 42 by an amount key operates, through the transmitting arms 179 and 180, to swing the actuating rod 232 and drive all the companion links 233 and 234 towards the left (Fig. 10), the studs 235 of the companion links traversing paths determined and controlled by the positions of the cam slots 236 in the respective differential segments.

Figure 2:
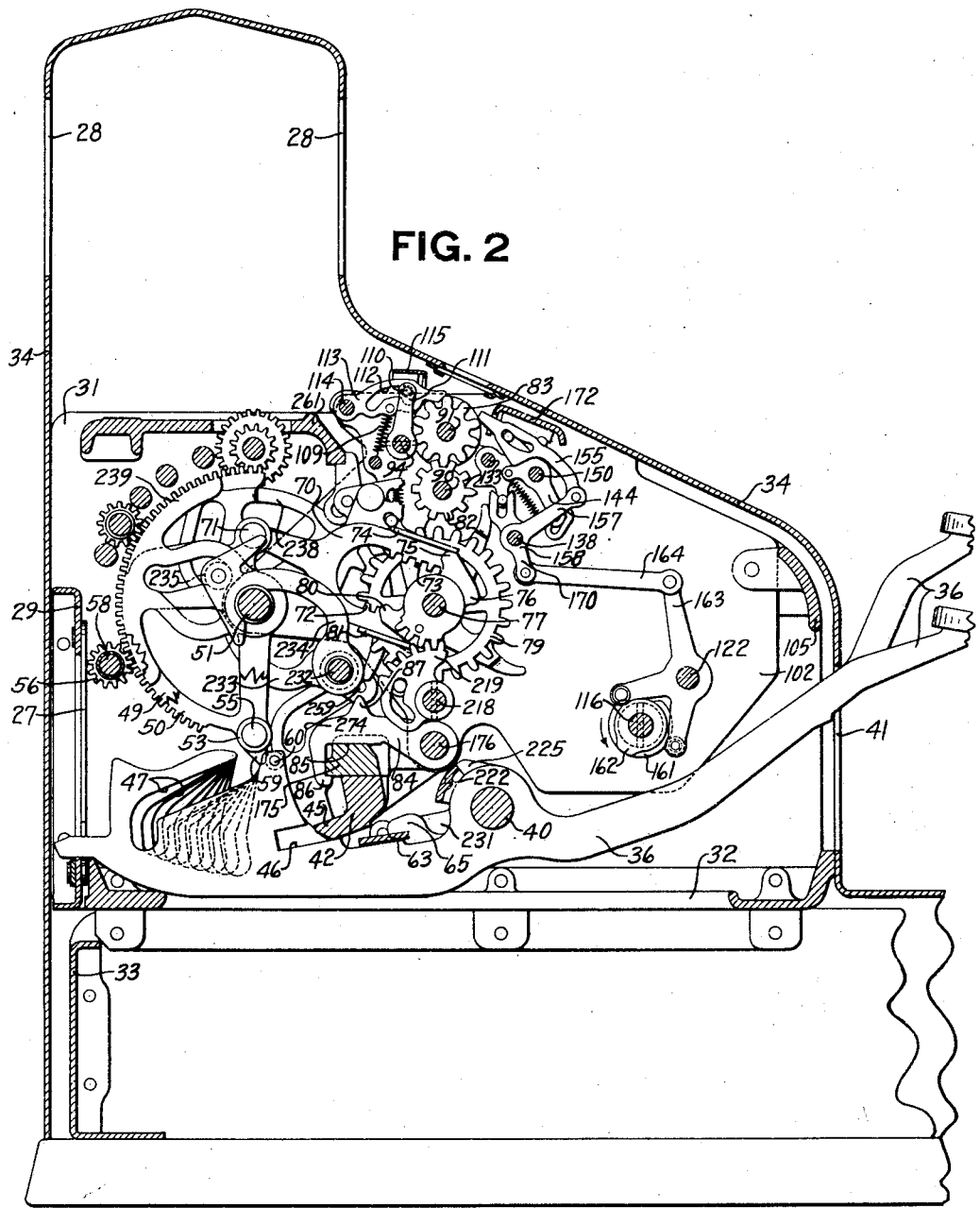
Fig. 2 is a transverse sectional view, showing in side elevation the tens of cents group of keys, differential and totalizer actuating mechanism therefor, with one of the differential segments broken away for clearness.

Since the to-and-fro movement imparted by the actuating rod 232 to the actuating companion links 233 and 234 is constant at each operation of the machine, the effect of the studs 235 of the companion links, on the setting racks 239, is to position the latter in accordance with the value of the key depressed, or, if no key has been depressed in any denominational group, the stud 235 in traversing the heart-shaped opening 229 in the corresponding setting rack 239, restores the latter, together with the associated indicator and type carrier (not shown) to their zero positions (Figs. 2 and 10).

The depressed amount key 35, 36, or 37 and differential segment upon their return to their home positions, restore the corresponding companion links 233 and 234 in counterclockwise direction towards their home positions, and at the same time, the return of the key coupler 42 draws the companion links forwardly to fit their outer hooked ends around the cross rod 51.

On adding operations, too, the series of connecting studs 235 of the companion links rock the control sectors 238 idly back and forth.

However, in totalizing operations, the pairs of companion links 233 and 234 serve to actuate the drivers 70 which rotate the totalizer wheels reversely until the drivers are arrested upon arrival of the totalizer wheels in their zero positions.

Assuming that there is an amount accumulated on the totalizer wheels 160 which it is desired to clear, preparatory to starting another accumulation, the parts being in their normal home positions, with the differential segments 49 etc., at the ends of their counter-clockwise travel, as in Figs. 2, 3, 10 and 13, the total key 39, upon depression, operates the transmitting arms 179 and 180 together with the key coupler 42, to drive the series of companion links 233 and 234 in a general upward direction.

A by-pass pawl 206 (Figs. 8 and 16) is pivoted at 207 to the rear arm of the total key lever 39, the nose of the pawl extending partway across the cam slot 215 in the rear arm of such key lever.

This cam slot 215 is wider than the diameter of the stud 212 carried by the reversing lever 213 except at its upper and lower ends corresponding to the home position and the extreme operated position, respectively, of the total key 39, and at the very beginning of the depression of the total key, the shape of the cam slot 215 assisted by the intruding nose of the by-pass pawl 206 crowds the stud 212 to the right (Fig. 8) to shift the reversing lever 213, shaft 218, and segments 219, to disengage the adding racks 72 from, and engage the totalizing racks 73 with the pinions 78 of the totalizer actuators 79, all as heretofore explained.

And to enable the companion links 233 and 234 to actuate the drivers 70 for the totalizer gears 82 under control of the totalizer gears themselves, the reversing segments 219 on the shaft 218 are each provided with a cam slot 240 (Figs. 4, 8 and 10), the upper end of which is substantially concentric with the axis of the reversing shaft 218.

Arresting levers 243 (Fig. 10) are journaled on the cross rod 77, one such lever adjacent each reversing segment 219, the lower arm 242 of each arresting lever carrying a stud 241 entered in the cam slot 240 of its associated reversing segment 219. The upper arm 250 of each arresting lever 243 carries a stud 244 projecting laterally into a short slot 251 formed in a detent 253 journaled on the cross rod 77, there being as many detents as there are levers 243.

The upper arms 250 of the arresting levers 243 lie parallel with their respective detents 253, the ends of the arms 250 extending past the ends of the detents. Angular locking devices 255 pivoted at 256 to the projecting ends of the several arms 250 of the arresting levers 243, each have a toothed arm and a slotted arm, the latter indicated by the reference numeral 249. The toothed arm of each detent 255 overhangs its associated totalizer actuator 79 for engagement therewith, under control of the corresponding detent 253 through a pin 254 on the detent embraced by the slot in the arm 249. Springs 257 interposed between the slotted arms 249 of the respective locking lever, and the fingers 248 on the arms 250 of the respective arresting levers 243, normally hold the toothed arms of the locking levers 255 apart from their totalizer actuators 79, and also, through the connecting pins 254, urges the detents 253 counter-clockwise, but such travel of the detents is limited by the studs 244 on the arms 250 of the arresting levers 243.

Studs 268 (Fig. 10) carried by the levers 243 enter limiting slots 259 formed in stationary partition plates 260 located between and separating the several denominational groups of levers just described, and similar studs 270 on the tails 264 of the detents 253 enter like slots in the partition plates, the free ends of the tails 264 of the several detents being laterally bent to normally lie just outside the paths of extended tripping teeth 130 on the respective totalizer gears 82, when the latter are in mesh with their totalizer actuators 79.

The partition plates 260 are mounted on the supporting rod 77 and the housing 261 (Figs. 2 and 10) for the indicators (not shown).

When the total key 39 is depressed, the mechanism illustrated in Fig. 8 rotates the reversing shaft 218 to shift the forked driving racks 70, as described above. The reversing segments 219, being fast on shaft 218, rotate therewith, and their cam slots 240 rock the arresting levers 243 counter-clockwise.

Due to the shape of the slot 215 (Fig. 8) in the rear arm of the total key 39, and the presence of the nose of the pawl 206, the reversing shaft 218 is actuated at the very beginning of the operation of the key 39 to adjust the drivers and the arresting levers 243 before the companion links 233 and 234 operate the drivers 70.

The arresting levers 243, (Fig. 10), when swung counter-clockwise, carry with them their detents 253 and locking arms 255, because of the stud connection 256 between the locking arms and their arresting levers, and the slot and pin connection 254 between the locking arms and the detents, the locking arms and detents being normally maintained against relative movement by the springs 257.

Figure 3:
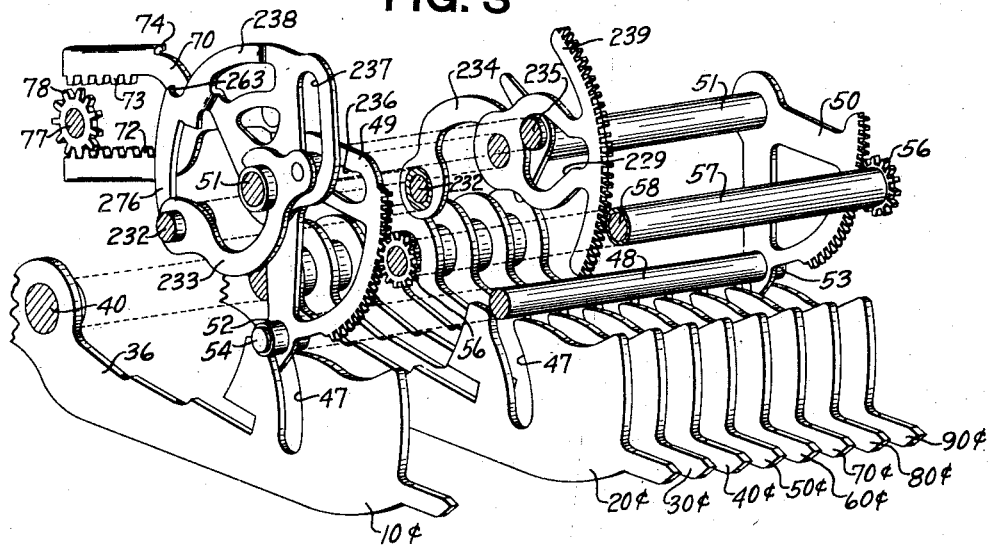
Fig. 3 is a rear perspective view of one of the groups of amount keys, the differential, and the totalizer rack actuated thereby.

Such counter-clockwise rocking movement hooks the noses 262 of the detents 253 over shoulders 263 (see also Fig. 16), formed on the peripheries of the respective control sectors 238, to prevent counter-clockwise rotation thereof, thus retaining their cam slots 237 stationary and in the positions shown in Figs. 3 and 10, to form temporarily fixed guides for the connecting studs 235 of the companion actuator links 233 and 234. The locking arms 255 at this time merely rock concentrically relatively to their totalizer actuators 79 without engaging the latter. The counter-clockwise rocking of the detents 253 to lock the control sectors 238, also positions the tails 264 of the detents in the paths of the long teeth 130 on the corresponding totalizer gears 82.

In this connection, it may be stated that the detents 253 may be equipped with as many tails 264 as there are totalizers, and though but one totalizer is shown herein, the provision of the extra tail on each detent indicates the possibility of using a plurality of totalizers.

The rod 232 on its clockwise travel, which starts immediately after the locking of the control sectors, forces the companion links 233 and 234 outwardly relatively to their respective control sectors 238, differential segments 49 etc., and setting segments 239, the connecting stud 235 of each pair of actuating links traversing the slot 236 of its differential segment 49 which is free to turn, under the guidance of the slot 237 of its control sector 238 which is locked against rotation at this time, as above explained.

As a result, the connecting studs 235 follow the contours of the slots 237 of the control sectors 238, and force the slots 236 of the freely rotatable differential segments to conform thereto, by rocking the differential segments clockwise, thus advancing the forked drivers 70, the totalizing racks 73 of which are in mesh with the pinions 76 of the totalizer actuators 79. And the totalizer having been rocked into engagement, its gears 82 are reversely rotated, i. e., in counter-clockwise direction, until the long teeth 130 of the gears 82 wipe against the tails 264 of their respective detents 253 to rock the detents clockwise out of effective position relatively to the shoulders 263 of the control sectors 238, thereby releasing the latter.

The differential segments at this time, have been turned clockwise through different arcs of travel to variously advance the drivers 70 distances depending upon the digits registered on the several totalizer gears, but the out strokes of the actuating companion links 233 and 234 may not have been completed by the time the totalizer gears arrive in their zero positions. Hence release of the control segments 238 at the time the long teeth 130 of the totalizer gears 82 pass from their "1" to their "0" positions would leave the parts wholly uncontrolled respecting the continued travel of the actuating companion links, to obviate which, the locking arms 255 are provided.

The long teeth 130 of the totalizer gears 82 rock the detents 253 to their ineffective positions relatively to the arresting levers 243, and as the noses 262 of the detents release the control sectors, the detents, through their slot and pin connections 254 with the toothed locking arms 255, rock the latter into engagement with the totalizer actuators 79 to lock the latter, and hence lock the totalizer gears 82 against rotation in either direction. The detents, in rocking clockwise relatively to the arresting levers 243, to release the control sectors 238 and lock the totalizer actuators 79, swing the locking arms 255 against the tension of the light springs 257, which remain under tension at this time.

Obviously, by locking the totalizer actuators 79 against rotation, the driver racks 70 and their associated differential segments are locked against advance, and the control of the companion link actuators 233 and 234 is switched from the control sectors 238 to the differential segments which now control the out strokes of the companion link actuators through the remainder of their travel, the control sectors 238 turning idly on the cross rod 51 as the connecting studs 235 of the companion links traverse their slots 237. The connecting studs 235, during their outstrokes, position the setting segments 239 to set the indicators and type carriers (not shown), and after the control of the direction of travel of the companion links is switched from the control sectors 238 to the differential segments the actuator links and connecting studs 235 complete the positioning of such of the setting segments 239 as is necessary, to properly locate the indicators and types representing the total of the amount registered on the totalizer wheels 160.

It is apparent that the control sectors 238 first position the differential segments in accordance with the amount registered on the totalizer wheels 160, the wheels clearing or returning to their zero positions during this operation, after which the differential segments control the setting segments 239 to locate the indicators and types properly, if they have not already been so located.

Figure 17:
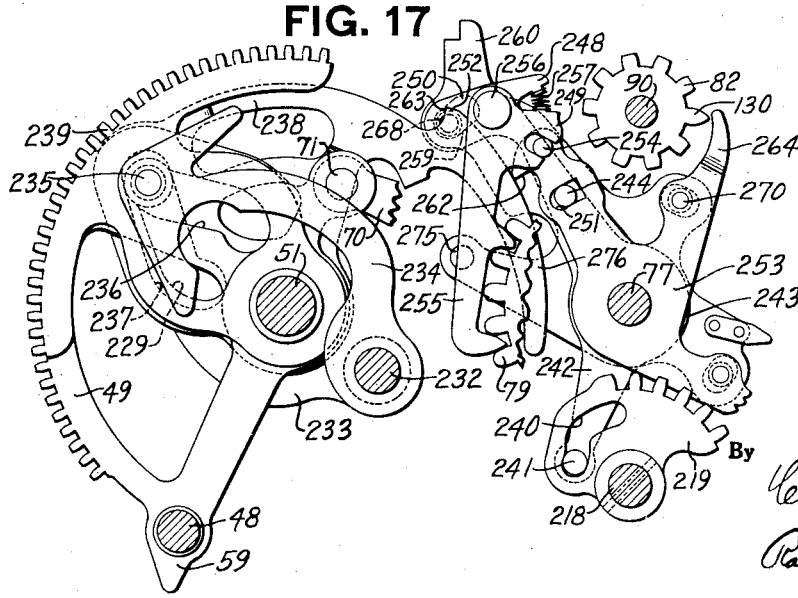
Fig. 17 is a similar view showing the positions assumed by the resetting mechanism when the total key has nearly reached the limit of its depression, just prior to fitting the lower end of the slot in the total key over the stud on the reversing lever.

It will be remembered that the studs 235 of the companion links 233 and 234 in completing their outstrokes, turn the control sectors 238 counter-clockwise after the release of the noses 262 of the detents 253 therefrom. The peripheral shoulders 263 of the control sectors are located at the upper ends (Fig. 10) of curved extensions 276, there being a slight incline 252 leading from the tip of each shoulder to its extension 276. As the control sectors 238 rock counter-clockwise, the inclined surfaces 252 ride beneath the ends of the noses 262 (as shown in Fig. 17), of the respective detents 253 and force the detents in clockwise direction to relieve the high teeth 130 of the totalizer gears 82 of the pressure of the tails 264 of the detents, and prevent accidental movement of the detents counter-clockwise which would prematurely release the locking arms 255 from the totalizer actuators 79. Also, the extensions 276, by rocking the detents 253 clockwise, cause the detents to press the locking arms 255 more tightly into engagement with the actuator wheels 79.

The totalizer is returned to zero or cleared, and the indicators and type carriers (not shown) are positioned to represent the amount formerly registered on the totalizer, before the total key 39 has quite completed its full depression.

It is necessary to effect a number of results substantially coincident with the arrival of the total key 39 in its farthest depressed position, such as— (a) disengage the totalizer gears 82 from their actuating wheels 79; (b) disengage the locking arms 255 from the actuating wheels 79, and (c) restore the control sector detents 253 to their home positions.

The inclined slots 273 (Figs. 11 and 13) in the transmitting arms 179 and 180 terminate at their lower ends in idle sections so that the final step of depression of the total key 39 has no effect on the studs 258, rod 232, and companion links 233 and 234, and consequently, the companion links are held in their extreme outward positions during the last step of the depression of the key and the first step of return of the key.

The total key, however, during this period continues to lift the transmitting arms 179 and 180 and rotate the driving shaft 116 (Fig. 5) to cause the cams 117 and 118 (Fig. 4) to operate the linkage heretofore explained and disengage the totalizer gears 82 from their actuating wheels 79.

The lower end of the cam slot 215 (Fig. 8) in the rear arm of the total key 39 is constricted, as shown, and as the total key completes its final step of depression, this constricted end of the slot contacts the stud 212 on the reversing lever 213 to rock the reversing shaft 218 and its reversing segments 219 in counter-clockwise direction partway towards their home positions. Such partial return of the reversing segments 219 causes the effective lower ends of the slots 240 therein to restore the arresting levers 243 (Fig. 10) to their home positions in clockwise direction.

At this time, it will be remembered, the noses 262 of the detents 253 are resting against the restraining peripheries of the extensions 276 of the control sectors 238, (as shown in Fig. 17), the pins 254 of the detents holding the locking arms 255 in engagement with the totalizer actuating wheels 79 against the tensions of the springs 257, with the studs 244 of the arresting levers 243 seated in the rounded ends of the slots 251 of the detents, and the forked drivers 70 at the forward ends of their strokes, the differential segments 49 etc. and the setting segments 239 being in their variously advanced clockwise positions, and the control sectors 238 in their various counter-clockwise positions.

The partial return of the reversing segments 219 is not sufficient to cause the wings 75 and 80 (Figs. 2 and 8) to shift the drivers 70 out of the positions to which they were adjusted by the total key 39 at the beginning of its depression.

The arresting levers 243, in rocking clockwise to their normal positions, carry with them the pivots 256 of the locking arms 255, and the studs 244, but at this time, the springs 257 hold the noses 262 of the detents 253 against the peripheries of the extensions 276 of the control sectors 238, so that the studs 244 merely traverse the slots 251 in the detents 253, and the studs 254 of the detents remain stationary, and due to the connection of the bifurcated ends of the arms 249 of the locking arms with the stationary studs 254, the locking arms 255 are rocked clockwise to disengage them from the totalizer actuating wheels 79. Continued travel of the arresting levers 243 with their studs 244 causes the latter to contact the squared ends of the slots 251 in the detents 253 and withdraw the noses 262 of the detents from contact with the extensions 276, the springs 257 facilitating the disengagement of the locking arms 255.

The total key 39 having reached its fully depressed position, pressure thereon is removed, whereupon the weight of the key coupler 42 restores the key. As the key coupler descends in counter-clockwise direction with the transmitting arms 179 and 180, the studs 258 on the arms 104 retrace their paths in the slots 273 of the transmitting arms and draw the outer ends of the companion links 233 and 234 and their connecting studs 235 inwardly towards the cross rod 51.

The connecting studs 235 retracing their paths in the cam slots 236 and 237 of the differential segments and of the control segments 238, respectively, return the segments and sectors in opposite directions to their home positions, the differential segments being arrested by contact with their stop studs 69 (Fig. 2) in home position, as heretofore explained, and projections 275 (Fig. 10) arresting the control sectors in their home positions.

The differential segments, as they restore, withdraw the forked drivers 70 to their normal positions, the drivers idly rotating the totalizer actuating wheels 79 as they retire.

As the total key 39 approaches the end of its return stroke, the stud 212 (Fig. 8) on the reversing lever 213 strikes and cams the nose of the pawl 206 out of its path. A pin 209 on the rear arm of the total key 39 lies between the ends of a recess in the pawl 206 to limit the rocking of the latter in either direction, and as the key arrives in its home position, the tail of the pawl strikes a pin 208 on the frame, which causes the pawl to rock to return the nose of the pawl into the path of the stud 212 preparatory to the next operation of the total key. Also, as the total key approaches its home position, the upper end of the cam slot 215 operating upon the stud 212, completes the return of the reversing lever 213, reversing shaft 218 and reversing segments 219 to their normal positions, the segments 219, in turn, rocking the mutilated gears 220 with their wings 75 and 80 to disengage the totalizer racks 74 of the drivers 70 out of engagement with the pinions 78 and restore the adding racks 72 into engagement therewith.

As an illustration of the necessity for providing a positively operating totalizing mechanism, it will be assumed that one or more of the totalizer wheels 160 register "9" at the time it is desired to clear the totalizer.

The companion links 233 and 234 will have substantially completed their outward strokes before those totalizer gears which registered "9" will have brought their long teeth 130 into contact with the tripping arms 264 of the detents 253.

If the flexible or cushioned key coupler drive for the rod 232 and its actuating links 233 and 234 was relied upon, it is quite possible that under certain operating conditions, the load placed on the cushioned key coupler incident to driving the companion links 233 and 234, might very probably cause the several mechanisms given by the key coupler to lag, and as the detents 253 with their fingers 264 are positively restored by the total key 39 at the end of its down stroke, as soon as the driving action of the actuator studs 235 is completed, it is evident that any lag in the reverse rotation of the totalizer gears 82 to their zero positions will permit the total key 39 to restore the detent fingers 264 before the gears 82 arrive at their zero positions, thus releasing the control sectors 238 before the totalizer wheels return to their zero positions. This, of course, would result in a wrong total being taken from the totalizer, and the totalizer would not be completely reset.

The differentials associated with the overflow totalizer gears of higher order differ somewhat from the differentials actuated by the depression of the amount keys. Operation of the overflow differentials is confined to totalizing operations. At such operations these differentials are adjusted under the control of the overflow totalizer gears to set up type elements (not shown) to print the totals, and to indicate the total amount.

The principal difference is that, since the overflow differentials (Fig. 9) are not adjusted directly by depression of the amount keys, the universal rods such as 48 (Fig. 3) are unnecessary as are also the segments such as 49 and 50. These parts are therefore, omitted from the overflow differentials, and an arm 283 having a cam slot 236 therein, is substituted. These cam-slotted arms 283 actuate forked drive racks 70, to adjust the corresponding actuator wheels 79. Differential actuators comprising pairs of companion links 233 and 234 and a stud 235 are provided to operate the several denominational arms 283 under the control of their respective totalizer gears 82 in the same manner in which the segments 49 etc. are adjusted on totalizing operations.

Since the actuator wheels 79 associated with the overflow totalizer gears 82 are not actuated on adding operations, means is provided to aline such actuator wheels, and also to aline the forked racks 70 and the differential mechanism comprising the cam-slotted arms 283 in their normal positions until such time as it is desired to take a total, and the total key 39 is depressed.

This alining means includes studs 284 projecting laterally from the particular reversing segments 219 on the reversing shaft 218, which are associated with the overflow totalizer gears. These studs 284 normally engage between the teeth of the overflow actuator wheels 79 and hold them, together with the drive racks 70 and slotted arms 283, against movement until the total key 39 is depressed. It will be remembered that depression of the total key rocks the reversing shaft 218 and all of the reversing segments 219 clockwise to shift the forked drive racks 70. Clockwise movement of the reversing segments 219 withdraws the locking studs 284 from between the teeth of the overflow totalizer actuator wheels 79, whereupon the latter and their respective differential mechanisms are free to be adjusted under the control of the overflow totalizer gears 82, as explained above.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:

1. In a machine of the class described; the combination with a plurality of totalizer elements; and actuators therefor; of driving elements for said actuators having opposed racks thereon, one rack of each element adapted to add amounts on the totalizer elements; manipulative keys to operate the driving elements to add amounts on the totalizer elements corresponding to the particular keys operated; and a single manipulative device to shift the driving elements into position whereby the other rack of each element is adapted to take totals from said totalizer, said single manipulative device also adapted to operate the driving elements to take the totals.

2. In a machine of the class described; the combination with a totalizer; and totalizer actuators; of a shiftable driving element for each totalizer actuator, carrying opposed racks; means to differentially actuate the driving elements when in one position relatively to their totalizer actuators to add amounts onto the totalizer; means to shift the driving elements; and a single manipulative means to operate the shifting means and to actuate the driving elements when shifted, to restore the totalizer to zero.

3. In a machine of the class described; the combination with a totalizer; and actuators therefor; of driving elements having opposed racks thereon, either of which is adapted to engage its corresponding totalizer actuator; a series of depressible keys having differential slots therein to variously position the driving elements to add amounts onto the totalizer; means to shift the driving elements to disengage one set of racks from the totalizer actuators, and to engage the remaining set of racks therewith; and means to differentially actuate the driving elements when thus shifted to reset the totalizer to zero.

4. In a machine of the class described; the combination with a totalizer; and actuators for said totalizer; of manipulative means to differentially drive said actuators, including a plurality of sets of racks; means to normally hold one set of such racks in mesh with the totalizer actuators to enable the manipulative means to add amounts onto the totalizer; means to disengage said adding racks from the totalizer actuators and to engage the remaining racks therewith; other normally ineffective actuating means for the racks; and a manipulative device to render such actuating means effective to reversely turn the totalizer to zero.

5. In a machine of the class described; the combination with a totalizer; actuators therefor; and groups of keys to drive their respective actuators to add amounts onto the totalizer; of a forked rack carrying opposed racks intermediate each group of keys and the corresponding actuator; driving connection intermediate the keys and the forked rack; means to normally hold one set of said opposed racks engaged with the totalizer actuators to add amounts on the totalizer when said keys are operated; means to shift the forked racks to disengage the adding racks from the totalizer actuators and to engage the remaining set of racks therewith; and a single manipulative key adapted to actuate the driving connections to drive the racks to restore the totalizer to zero when the remaining set of racks are engaged with the actuators.

6. In a machine of the class described; the combination with a totalizer; and actuators therefor; of shiftable driving elements for the actuators, each comprising a forked rack provided with flanges; means relatively to which the racks reciprocate, said means including oppositely extending members each cooperating with one flange of each pair of flanges to normally hold one or the other set of racks engaged with the actuators; a shaft supporting said means; and manipulative means to rock the holding means to shift the racks.

7. In a machine of the class described; the combination with a totalizer; and actuators for said totalizer; of flanged racks opposed to each other and cooperating with the actuators; a cam means cooperating with the flanges of the racks to normally hold one or the other set of opposed racks in mesh with the actuators; a shaft supporting the cam means; a reversing lever having a stud; means to connect the cam-supporting shaft and the lever; and a manipulative device having a cam slot cooperable with the stud to rock the shaft, and turn the cam means to shift the racks.

8. In a machine of the class described; the combination with a totalizer; actuators for said totalizer; and racks to drive the actuators; of differential members connected to said racks, each of which differential members has a slot; series of manipulative keys to differentially actuate the members to add amounts onto the totalizer; control sectors pivoted concentrically with the differential members, and each having a slot; denominational pairs of companion links, a stud projecting through the slots in the corresponding differential member and sector, and joining each pair of links; a manipulative device to reciprocate the pairs of companion links; normally ineffective means to restrain the control sectors against movement; and means operated by the manipulative device to render the restraining means effective to restrain the sectors, whereby operation of the companion links guided by the control sectors, rocks the differential members and advances the racks to reset the totalizer to zero.

9. In a machine of the class described; the combination with a plurality of keys; of a drive shaft; a member common to all of said keys and shiftable thereby; a transmitting member driven by said common member to actuate the drive shaft; a flexible drive means interposed between said common member and said transmitting member; and means to actuate the transmitting member directly regardless of the flexible means.

10. In a machine of the class described; the combination with a plurality of keys; and a shiftable member common to all of said keys, and adapted to drive in both directions; of a transmitting member; springs between the driving member and the transmitting member to render the drive flexible in one direction; a shoulder on the driving member; a hook on said transmitting member to cooperate with the shoulder and afford a loose connection between the shiftable and the transmitting members; and a special manipulative device to operate the transmitting member and render positive the drive of the shiftable member in both directions.

11. In a machine of the class described; the combination with a plurality of amount keys; a total key; a coupler common to all of said keys; of a transmitting element loosely mounted on and capable of a limited movement relatively to the coupler; springs interposed between the coupler and the transmitting element, and effective upon depression of any amount key to impart a cushioned movement to the transmitting element; and means intermediate the transmitting element and the total key to enable the latter to directly drive the transmitting element in one direction regardless of the springs.

12. In a machine of the class described; the combination with a plurality of amount keys; a total key; and a member common to all of the amount keys and the total key; of a drive shaft adapted to be rocked by all of the keys; a transmitting member connected with the shaft; a spring intermediate the common member and the transmitting member to cause the shaft to be flexibly rocked by the key-actuated member; an arm operable by the total key; and a projection on the arm to directly actuate the transmitting member.

13. In a machine of the class described; the combination with a plurality of amount keys; a total key; and a universal member common to all of said keys; of a drive shaft; a transmitting arm connected with the shaft; a spring interposed between the universal member and the transmitting arm to flexibly drive the shaft upon depression of an amount key; a second arm adapted to contact the transmitting arm; a shoulder on the second-named arm; and a bail operable by the total key to cooperate with the shoulder and directly rock the transmitting arm and drive shaft.

14. In a machine of the class described; the combination with a series of denominational totalizer actuators of a denominational driving element for each denominational totalizer actuator; the denominational driving elements each having opposed racks, and being shiftable to engage one or the other of its racks with its denominational totalizer actuator; means to shift the driving elements; and a single manipulative device adapted to operate the shifting means to shift the driving elements in one direction and then restore them to normal, and to operate the driving elements.

15. In a machine of the class described, the combination with a totalizer, including a series of denominational members; actuators relatively to which the totalizer members are engageable and disengageable; means to effect the engagement and disengagement of the totalizer relatively to its actuators; groups of keys individual to several of the denominational totalizer elements and adapted to operate the totalizer engaging and disengaging means; and denominational differential frames operable by any of the keys in its respective group; of denominational driving elements associated with the respective differential frames and totalizer actuators, the driving elements each having opposed racks and being shiftable to engage one or the other of its racks with its totalizer actuator; means to shift the driving elements in opposite directions; a single manipulative device adapted to operate the shifting means; actuating means separate from the keys and driven by the manipulative device to operate the driving elements; normally idle control members for the actuating means; and means controlled by the manipulative device to render the control members effective.

16. In a machine of the class described, the combination with a totalizer; actuators therefor; differential devices; and groups of keys to variously position their respective differential devices; of driving elements shiftably connected with the respective differential devices, and each having a plurality of racks, one of which is normally engaged with its corresponding totalizer actuator; means to shift the driving elements transversely relatively to the totalizer actuators to disengage the normally engaged racks from, and engage the remaining racks with the totalizer actuators; and operating means driven by the means which shifts the driving elements, to actuate the driving elements.

17. In a machine of the class described, the combination with a totalizer; actuators therefor; differential devices; and groups of keys to variously position their respective differential devices; of driving elements for the actuators comprising racks and pinions, connected to the respective differential devices; and a stop on one key of each group to arrest the corresponding differential device in its home position.

18. In a machine of the class described, the combination with a totalizer; actuators therefor; differential devices; and denominational groups of keys to variously position their respective differential devices; of driving elements comprising racks and pinions for the totalizer actuators, connected with their respective differential devices; of means normally engaging the differential devices to normally lock the differential devices in their home positions; and yokes common to the individual keys of their respective denominational groups and engaged with the corresponding differential-locking means to enable the keys to displace the differential-locking means prior to actuating the differential devices.

19. In a machine of the class described, the combination with a totalizer; actuators therefor; differential devices; pivotally mounted denominational groups of keys to variously position their respective differential devices; and driving elements for the totalizer actuators, connected with their respective differential devices; of pivotally mounted means to lock the differential devices in their home positions said differential locking means being concentrically pivoted with relation to said keys; and yokes common to the individual keys of their respective groups and pivoted concentrically with the respective differential-locking means, the yokes resting on and being connected with their corresponding differential-locking means to enable any key of a group to displace the corresponding differential-locking means.

20. In a machine of the class described, the combination with a totalizer; denominational actuators therefor; denominational driving elements for the totalizer actuators; differential members to operate the driving elements; and keys to variously position the differential members; of cushioned means operated by the keys to engage the totalizer with and disengage it from its actuators.

21. In a machine of the class described, the combination with a totalizer; denominational actuators therefor; denominational driving elements for the totalizer actuators; differential members to operate the driving elements; and keys to variously position the differential members; of cushioned means operated by the keys, including a driven member common to all the keys and operable by any thereof; an arm rotatable concentrically with the driven member and having a loose connection with the driven member; a spring interposed between the driven member and the arm; a drive shaft; driving connections between the arm and the shaft to impart a complete rotation thereto; cams on the drive shaft and a linkage operable by the cams to positively engage the totalizer with and disengage it from its actuators.

22. In a machine of the class described, the combination with a totalizer; denominational actuators therefor; denominational driving elements for the totalizer actuators; differential members to operate the driving elements; and keys to variously position the differential members; of cushioned means operated by the keys, including a driven member common to all the keys and operable by any thereof; a drive shaft; means between the driven member and the drive shaft, and having a loose connection with the driven member to transmit power to the drive shaft; a spring interposed between the driven member and the transmitting means; and means between the drive shaft and the totalizer to shift the totalizer into and out of engagement with its actuators.

23. In a machine of the class described, the combination with a totalizer; and actuators therefor; of driving elements for the actuators, each driving element provided with a pair of racks for turning its actuator in opposite directions; differential members to which the driving elements are shiftably connected; keys to drive the differential members; a second mechanism to actuate the differential members while the keys remain idle; means to shift the driving elements to disengage the normally meshed racks from the actuators, and engage the normally unmeshed racks with the actuators; and a manipulative member to drive the second-named actuating means and to operate the shifting means for the driving elements.

24. In a machine of the class described, the combination with a totalizer including gear members; shiftable elements, each carrying an adding rack and a totalizing rack to drive the totalizer gears; rotatable toothed devices, wings on each toothed device to position the shiftable elements relatively to the totalizer gears for adding and totalizing; means to actuate the rotatable toothed devices; and a manipulative means to operate the last-named actuating means.

25. In a machine of the class described, the combination with totalizer wheels; driving elements, each having an adding and a totalizing rack to turn the totalizer wheels in opposite directions; the adding racks being normally effective; differential devices to actuate the driving elements, respectively; and amount keys to variously position the differential devices; of a second series of actuators to drive the differential devices under control of the totalizer wheels; means to shift the driving elements to render the adding racks ineffective and the totalizer racks effective; and a manipulative device to drive the shifting means and the second-named series of actuators successively.

26. In a machine of the class described, the combination with totalizer wheels; driving elements therefor; and key-controlled means to actuate the driving elements to extents to correspond with the values of the keys depressed; of another series of actuators for the driving elements; normally idle control members for the second-named series of actuators; a manipulative device to operate the second-named series of actuators; means operated by the manipulative device to render the control members effective; and means actuated by the totalizer wheels to lock the driving elements in the positions to which they have advanced when the totalizer wheels arrive in their zero positions, and to render the control members ineffective.

27. In a machine of the class described, the combination with totalizer wheels; driving elements therefor; and key controlled means to actuate the driving elements to extents to correspond with the values of the keys depressed; of another series of actuators for the driving elements adapted to have a travel of constant length; normally idle control members for the second-named series of actuators; a manipulative device to operate the second-named series of actuators; and means operated by the manipulative device to render the control members effective.

28. In a machine of the class described, the combination with totalizer wheels; driving elements therefor; and key-controlled means to actuate the driving elements to extents corresponding to the values of the keys depressed; of another series of normally ineffective actuators for the driving elements; normally ineffective control members for the last-named actuators; a manipulative device to render the control members effective and to drive the last-named series of actuators; normally ineffective locking means for the totalizer wheels; and means controlled by the totalizer wheels as they arrive in predetermined positions to render ineffective the control members for the actuators, and to render the locking means effective.

29. In a machine of the class described, the combination with totalizer wheels; driving elements therefor; and key-controlled means to actuate the driving elements to extents corresponding to the values of the keys depressed; of another series of normally ineffective actuators for the driving elements; normally ineffective control members for the last-named actuators; normally idle detents adapted to engage the control members to render the latter effective; a manipulative device to shift the detents to effective position, to render the control members effective; the detents, when so shifted, being under control of the totalizer wheels; and normally ineffective locking means for the totalizer wheels, controlled by the detents to engage the totalizer wheels when the latter, upon arrival in predetermined positions, rock the detents to their ineffective positions.

30. In a machine of the class described, the combination with totalizer wheels; driving elements therefor; and key-controlled means to actuate the driving elements to extents corresponding to the values of the keys depressed; of another series of normally ineffective actuators for the driving elements; normally ineffective control members for the last-named actuators; normally idle detents pivotally supported adjacent the control members to engage the latter to render them effective; locking means for the totalizer wheels, having a loose connection with the detents; a manipulative device to engage the detents with their respective control members, and simultaneously place the detents under the control of the totalizer wheels; the totalizer wheels, upon arriving at predetermined positions, adapted to displace the detents and simultaneously rock the locking means to its effective position.

31. In a machine of the class described, the combination with totalizer wheels; driving elements therefor; and key-controlled means to actuate the driving elements to extents corresponding to the values of the keys depressed; of another series of normally ineffective actuators for the driving elements; normally ineffective control members for the last-named actuators; a series of arresting levers; a detent pivotally supported adjacent each arresting lever to engage its corresponding control member, and having a tail; a locking arm pivoted on each arresting lever, and pivotally connected with its adjacent detent; and a manipulative device operable to shift the arresting levers and detents to effect the engagement of the latter with the control members, and bring the tails of such detents under control of the totalizer; and means on the totalizer adapted to contact the tails of the detents to shift the detents to ineffective position and the locking arms to effective position.

32. In a machine of the class described, the combination with totalizer elements; a differentially adjustable driving element for each totalizer element; and means to differentially actuate the driving elements to add amounts on the totalizer elements; of means to reset the totalizer elements to zero, including other actuating means for the driving elements; normally ineffective control members for the last-named actuating means; normally ineffective retaining means to render the control means effective, such normally ineffective means, when in effective position, adapted to be automatically controlled by the totalizer elements; means to lock the totalizer elements in their zero positions; and a manipulative device to shift the normally ineffective retaining means to effective position and to return it to its home position; and means on the totalizer elements and operable as the totalizer elements arrive in their zero positions, to render the retaining means ineffective and the totalizer locking means effective.

33. In a machine of the class described, the combination with totalizer elements; a differentially adjustable driving element for each totalizer element; and means to differentially actuate the driving elements to add amounts on the totalizer elements; of means to reset the totalizer elements to zero, including other actuating means for the driving elements; normally ineffective control members for the last-named actuating means; normally ineffective retaining means to render the control means effective, such normally ineffective means, when in effective position, adapted to be automatically controlled by the totalizer elements; means to lock the totalizer elements in their zero positions; and a manipulative device to shift the normally ineffective retaining means to effective position and to return it to its home position; and means on the totalizer elements and operable as the totalizer elements arrive in their zero positions, to render the retaining means ineffective and the totalizer locking means effective; and means to prevent the retaining means from again becoming effective until the next operation of the manipulative device.

34. In a machine of the class described, the combination with totalizer elements; a differentially adjustable driving element for each totalizer element; and means to differentially actuate the driving elements to add amounts on the totalizer elements; of means to reset the totalizer elements to zero, including other actuating means for the driving elements; normally ineffective control members for the last-named actuating means; normally ineffective retaining means to render the control means effective, such normally ineffective means, when in effective position, adapted to be automatically controlled by the totalizer elements; means to lock the totalizer elements in their zero positions; and a manipulative device to shift the normally ineffective retaining means to effective position and to return it to its home position; and means on the totalizer elements and operable as the totalizer elements arrive in their zero positions, to render the retaining means ineffective and the totalizer locking means effective; and means to block the return of the retaining means to effective position pending its return to home position.

35. In a machine of the class described, the combination with totalizer elements; a differentially adjustable driving element for each totalizer element; and means to differentially actuate the driving elements to add amounts on the totalizer elements; of means to reset the totalizer elements to zero, including other actuating means for the driving elements, such other actuating means having a constant travel from and towards its home position; normally ineffective control members to render the last-named actuating means effective; a manipulative device; and means settable by the manipulative device to render the control members effective, such adjustment of the settable means adapted to place it under control of the totalizer elements, as they reach their zero positions, to enable the totalizer elements to render the settable means ineffective, and thus render the control members ineffective.

36. In a machine of the class described, the combination with totalizer elements; of a differentially adjustable driving element for each totalizer element; the differentially adjustable driving elements equipped with cam surfaces; means to actuate the differentially adjustable driving elements to add amounts on the totalizer elements; means to reversely rotate the totalizer elements, including other actuating means for the differentially adjustable driving elements, engaging the cam surfaces thereof; normally ineffective control members engaged with the last-named actuating means to render such means effective to operate the driving elements; a manipulative device; and means settable by the manipulative device to render the control members effective, such adjustment of the settable means adapted to place it under control of the totalizer elements, as they reach their zero positions, to enable the totalizer elements to render the settable means ineffective and thereby render the control members ineffective.

37. In a machine of the class described, the combination with totalizer elements; of a differentially adjustable driving element for each totalizer element, including a cam track; means to actuate the differentially adjustable driving elements to add amounts on the totalizer elements; means to reversely rotate the totalizer elements, including other actuating means for the differentially adjustable driving elements, adapted to traverse the cam tracks thereof and normally following such cam tracks; control members for the last-named actuating means, having cam tracks angularly displaced relatively to the cam tracks of the driving elements, the last-named actuating means adapted to traverse the cam tracks in the control members to idly shift the control members; means operable at will to detain the control members to cause their cam tracks to render the last-named actuating means effective to operate the driving elements; and means controlled by the totalizer elements to disable the detaining means.

38. In a machine of the class described, the combination with totalizer elements; of a differentially adjustable driving element for each totalizer element, including a cam track; means to actuate the differentially adjustable driving elements to add amounts on the totalizer elements; means to reversely rotate the totalizer elements, including other actuating means for the differentially adjustable driving elements, adapted to traverse the cam tracks thereof and normally following such cam tracks; control members for the last-named actuating means, having cam tracks angularly displaced relatively to the cam tracks of the driving elements the last-named actuating means adapted to traverse the cam tracks in the control members to idly shift the control members; means operable at will to detain the control members to cause their cam tracks to render the last-named actuating means effective to operate the driving elements, said detaining means automatically operable by the totalizer elements as they reach their zero positions, to disable the control member detaining means regardless of the means operable at will.

39. In a machine of the class described, the combination with totalizer elements; a differentially adjustable driving element for each totalizer element; and means to actuate the differentially adjustable driving elements to add amounts on the totalizer elements; of means to reversely rotate the totalizer elements, including other actuating means for the differentially adjustable driving elements; normally idle means to control the last-named actuating means and render it effective; means operable at will to render the actuator-controlling means effective; and means operated by the totalizer elements to automatically disable the normally idle means.

40. In a machine of the class described, the combination with totalizer elements; a differentially adjustable driving element for each totalizer element; and means to actuate the differentially adjustable driving elements to add amounts on the totalizer elements; of means to reversely rotate the totalizer elements, including other actuating means for the differentially adjustable driving elements; normally idle means to control the last-named actuating means and render it effective upon the driving elements; means operable at will to render the actuator-controlling means effective; means on the totalizer elements to automatically disable the normally idle actuator-controlling means; and indicator positioning means adjusted by the last-named actuating means.

41. In a machine of the class described, the combination with totalizer elements; and driving racks therefor; of pivotally supported differentially adjustable, key-operated members connected with the respective driving racks, each differentially adjustable member having a cam track; a control member pivoted concentrically with its respective differentially adjustable member and having a cam track normally divergent from the cam track in its associated differential member; an indicator positioning means pivoted concentrically with each differential member and its control member; and having a centering slot conformable with the cam tracks in either the differentially adjustable member, or with the control member; actuating means traversing the cam tracks in the differential and the control members of a group, and through the slot in the corresponding positioning means, and being guided by the cam tracks in the respective differential members, in adding operations, to set the positioning members; means operable at will to render the control members effective to guide the actuating means and cause it to operate the driving elements to reversely rotate the totalizer elements and set the positioning devices according to the amount registered on the totalizer elements; and means controlled by the totalizer elements as they approach their zero positions, to disable the means which renders the control members effective, and free the control members for idle operation by the actuators.

42. In a machine of the class described, the combination with totalizer elements; a driving element for each totalizer element; a differentially adjustable member for each driving element; and means to variously adjust the differential members to add amounts on the totalizer elements, the differential members returning to their home positions at the end of each operation of the machine; of means to reversely rotate the totalizer elements including normally idle control members restored to their home positions at the end of each operation of the machine; other actuators for the differential members and connected with the control members to normally shift the corresponding differential and control members towards and from each other; means operable at will to render the control members effective; and means controlled by the totalizer elements to disable the last-named means.

43. In a machine of the class described, the combination with totalizer elements; a driving element for each totalizer element; a differentially adjustable member for each driving element; and means to variously adjust the differential members to add amounts on the totalizer elements, the differential members returning to their home positions at the end of each operation of the machine; of means to reversely rotate the totalizer elements, including normally idle control members restored to their home positions at the end of each operation of the machine; other actuators for the differential members and connected with the control members to normally shift the corresponding differential and control members towards and from each other, the last-named actuators having constant paths of travel; means operable at will to arrest the control members to enable the actuators to drive the differential members relatively to the control members through distances equal to the number of steps represented by the amounts registered on the corresponding totalizer elements; and means controlled by the totalizer elements to disable the last-named means and lock the totalizer elements, to enable the actuators to drive the control members relatively to their differential members, and under control thereof for distances complementary to the distances through which the actuators drove the differential members.

44. In a machine of the class described, the combination with totalizer elements; a driving element for each totalizer element; and means to variously actuate the driving elements to add amounts on the totalizer elements; of means to reversely rotate the totalizer elements, including other actuators for the driving elements; normally idle control members for the actuators; means to render the control members effective; a manipulative device having a cam slot therein; rocking members to shift into and out of operative position the means for rendering the control members effective; and connections between the manipulative device and the rocking members to enable the manipulative device to control the rocking members.

45. In a machine of the class described, the combination with totalizer elements; a driving element for each totalizer element; and means to variously actuate the driving elements to add amounts on the totalizer elements; of means to reversely rotate the totalizer elements, including other actuators for the driving elements; normally idle control members for the actuators; means to render the control members effective; a manipulative device having a cam slot therein; rocking members to shift into and out of operative position the means for rendering the control members effective; and connections between the manipulative device and the rocking members to enable the manipulative device to control the rocking members, including a reversing lever, a stud on the reversing lever entered in the cam slot in the manipulative device, which slot is wider than the diameter of the stud; and a by-pass pawl on the manipulative device to crowd the stud to one side of the slot as the manipulative device travels in one direction.

46. In a machine of the class described, the combination with totalizer elements; a driving element for each totalizer element; and means to variously advance the driving elements to add amounts onto the totalizer elements; of means to reversely rotate the totalizer elements, including other actuators for the driving elements; normally idle control members for the last-named actuators; means to render the control members effective; and a manipulative device movable in opposite directions and adapted to shift the last-named means to one and then the other of its positions during the travel of the manipulative device in one direction.

47. In a register the combination with totalizer elements; actuators therefor; means, including a rockable shaft, to engage the totalizer elements with and disengage them from their actuators; and means to variously advance the actuators to add amounts on the totalizer elements; of cam-slotted detents engageable with the totalizer elements; springs to yieldingly retain the detents in engagement with their totalizer elements; arms on the rockable shaft; studs carried by the arms and adapted to traverse the cam slots in the detents to render the latter ineffective and effective as the totalizer elements are engaged with and disengaged from their actuators.

48. In a register, the combination with totalizer elements; actuators therefor; relatively to which the totalizer elements are engaged and disengaged; and means to variously advance the actuators to add amounts on the totalizer elements; of pivoted detents shiftable with the totalizer elements as the latter are engaged with and disengaged from their actuators, and normally engaged with their totalizer elements; means shiftable as an incident to the engagement of the totalizer elements with their actuators, to disable the detents; the totalizer elements being positively rotatable while engaged by the detents.

49. In a register, the combination with totalizer elements; actuators therefor; relatively to which the totalizer elements are engaged and disengaged; and means to variously advance the actuators to add amounts on the totalizer elements; of pivoted detents shiftable with the totalizer elements as the latter are engaged with and disengaged from their actuators, and normally engaged with their totalizer elements, the detents having cam slots formed therein with clearances; operating means entered in the cam slots to disengage the detents from their totalizer elements, the operating means normally positioned adjacent the clearances in the slots; and means to positively turn the totalizer elements during the engagement of the detents therewith, the clearances enabling the detents to shift towards their idle positions independently of their operating means.

50. In a machine of the class described, the combination with a totalizer; denominational actuators therefor; denominational driving elements for the totalizer actuators; differential members to operate the driving elements; and keys to variously position the differential members; of means common to and operable by any of said keys; means connected to the common means to engage the totalizer with and disengage it from its actuators; and a cushioning device intermediate the last two means.

51. In a machine of the class described, the combination with a totalizer; denominational actuators therefor; denominational driving elements for the totalizer actuators; differential members to operate the driving elements; and keys to variously position the differential members; of a plurality of devices on separate pivots but in axial alinement, one of said devices being operable by any of said keys to operate the other device to effect engagement of the totalizer with and disengagement from its actuators; and flexible means associated with both of said devices to enable one to move relatively to the other.

52. In a machine of the class described, the combination with a totalizer; denominational actuators therefor; denominational driving elements for the totalizer actuators; differential members to operate the driving elements; and keys to variously position the differential members; of a plurality of devices on separate pivots but in axial alinement, one of said devices being operable by any of said keys to operate the other device to effect engagement of the totalizer with and disengagement from its actuators; and cushioning means carried by one of said devices to prevent shock to the other device.

53. In a machine of the class described, the combination with a totalizer; denominational actuators therefor; denominational driving elements for the totalizer actuators; differential members to operate the driving elements; and keys to variously position the differential members; a driving device operable by said keys; a driven device operable by the driving device to engage the totalizer with and disengage it from its actuating device; and cushioning means intermediate the driving and driven devices to prevent shock or strain on the driven device.

54. In a machine of the class described; the combination with a totalizer element; and an actuator for the element; of a shiftable double rack adapted when in one position to operate the actuator to add into the element and when in another position to reset the element to zero, and means enabling the depression of a key to shift the rack to its resetting position and to turn the totalizer element to zero.

55. In a key driven machine of the class described, a totalizer, keys and elements driven by the keys and having two sets of racks thereon for driving the totalizer, means causing the driving movement of the keys and elements to differentially actuate the totalizer for adding when one set of racks is in position to drive said totalizer, means to shift the elements so as to place the remaining set of racks in position to drive the totalizer, and means causing the driving movement of the keys and elements to reset the totalizer to zero when the said remaining set of racks is in driving position.

56. In a machine of the class described; a totalizer; actuators for said totalizer; means for engaging and disengaging the totalizer therewith; a plurality of sets of racks; manipulative means to differentially drive said actuators through the racks; means to normally hold one set of racks in mesh with the totalizer actuators to enable the manipulative means to add amounts onto the totalizer; shifting means to disengage said adding racks from the totalizer actuators and to engage the remaining racks therewith; a normally ineffective means for driving said actuators through said racks; and a manipulative means to render the last mentioned drive effective and to operate said shifting means whereby the totalizer may be returned to zero.

57. In a machine of the class described, a slotted, pivotally mounted, totalizer actuating member, a slotted control member pivoted concentrically with the actuating member, and a driving member operating in the slot of both the actuating and the control member.

58. In a machine of the class described, a totalizer, means to enter an amount thereon, and means to take an amount therefrom including a slotted actuating member, a slotted control member, a driving member operating in the slots of both members, and means, controlled by the totalizer, to hold the control member against motion until the totalizer reaches zero, and to hold the actuating member against motion after the totalizer reaches zero.

59. In a machine of the class described, a totalizer, means to enter amounts into the totalizer, and means to take the entered amounts therefrom, including a pivoted member actuated while the totalizer is being moved to zero and stopped when the totalizer reaches zero, a second member pivoted on the same axis as the first member and lying stationary while the first member is being moved, and means to move the second member after the first member is stopped.

60. In a machine of the class described, a totalizer, means to enter an amount thereon, and means to take the entered amount therefrom, including a drive means having an invariable excursion, a pivoted member actuated by the drive means to move the totalizer to zero and stopped when the totalizer reaches zero, a second member pivoted on the same axis as the first member and held stationary while the first member is being moved, and means to release the second member for movement when the totalizer reaches zero, to enable the driving means to finish its excursion.

61. In a differential mechanism, an actuating member having a slot therein, a control member having a slot therein, a minimum movement member having a slot therein and a driving element operating in the slots of the three members.

62. In a differential mechanism, a pivoted actuating member having a slot therein, a control member pivoted concentrically with the actuating member and having a slot therein, a minimum movement member pivoted concentrically with the other two members and having a slot therein, and a driving element operating in the slots of all three members.

63. In a machine of the class described, a totalizer, and a differential mechanism, the movement of which is controlled by the totalizer in certain machine operations, and which includes a pivoted actuating member, a pivoted control member, a pivoted minimum movement member, and a driving element directly operating the three members.

64. A total taking mechanism comprising a differential mechanism consisting of a main differential actuator, an auxiliary differential actuator and means for driving said auxiliary differential actuator complementarily to said main differential actuator, a mutual locking mechanism between said main and auxiliary differential actuators, said locking mechanism locking said auxiliary differential actuator in one position of said locking mechanism and releasing said auxiliary differential actuator and locking said main differential actuator in another position of said locking mechanism, an adding wheel connected to said main differential actuator, and means connected to said adding wheel for actuating said locking mechanism from one locking position to the other when the adding wheel passes into its zero position.

65. A mechanism as specified in claim 64, in which said locking mechanism comprises a locking arm, a series of locking teeth positively connected to said main actuator, said locking arm engaging one of said locking teeth immediately upon said locking mechanism being actuated by the lug on said adding wheel.

66. A total taking mechanism comprising a differential mechanism consisting of a main differential actuator and an auxiliary differential actuator, and means for driving said main differential actuator and for driving said auxiliary differential actuator complementarily to said main differential actuator, an adding wheel driven by said main differential actuator, a pivoted locking mechanism engaging said auxiliary differential actuator in one position of said locking mechanism, said locking mechanism releasing said auxiliary differential actuator and locking said main differential actuator in another position of said locking mechanism, and means to actuate said locking mechanism from one position to the other when said adding wheel passes into its zero position.

67. A total taking mechanism including a main actuator, an adding wheel connected to said main actuator, a totalizing tooth on said adding wheel, a finger adapted to be engaged and actuated by the said totalizing tooth of said adding wheel, means actuated by said finger to arrest said adding wheel in its zero position, means for moving said main actuator in an actuating direction and in a return direction, means for moving said finger into a position to be engaged by said totalizing tooth during the actuating motion of said main actuator and for moving said finger out of the path of said totalizing tooth during the return motion of said main actuator.

68. In a machine of the class described, a totalizer, two members, connecting means between one of said members and the totalizer, means for imparting movement to one of said members to control the operation of the totalizer for addition, means, effective during reset operations, for imparting complementary movements to said members, and means actuated by the totalizer when the totalizer reaches zero to control the relative movements of said members.

BERNIS M. SHIPLEY.

CERTIFICATE OF CORRECTION.

Patent No. 2,048,083. July 21, 1936.

BERNIS M. SHIPLEY.

It is hereby certified that error appears in the printed specification of the above numbered patent requiring correction as follows: Page 14, second column, line 25, claim 6, after "with" insert the words a pair of; page 15, first column, line 56, claim 14, after "actuators" insert a semicolon; and second column, line 66, claim 19, after "positions" insert a comma; same page, second column, line 46; page 18, first column, line 41; and second column, line 50; claims, 18, 38 and 42 respectively, after "elements" insert a comma; and that the said Letters Patent should be read with these corrections therein that the same may conform to the record of the case in the Patent Office.

Signed and sealed this 22nd day of September, A. D. 1936.

Henry Van Arsdale (Seal)   Acting Commissioner of Patents.